United States Patent
Jin et al.

(10) Patent No.: US 10,518,347 B2
(45) Date of Patent: Dec. 31, 2019

(54) ROOF LASER BRAZING SYSTEM

(71) Applicants: HYUNDAI MOTOR COMPANY, Seoul (KR); KIA MOTORS CORPORATION, Seoul (KR)

(72) Inventors: Taeheun Jin, Gyeongsan-si (KR); Minsun Sim, Incheon (KR); Jeongho Choi, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 475 days.

(21) Appl. No.: 14/948,138

(22) Filed: Nov. 20, 2015

(65) Prior Publication Data
US 2017/0028495 A1   Feb. 2, 2017

(30) Foreign Application Priority Data
Jul. 31, 2015 (KR) .................. 10-2015-0108918

(51) Int. Cl.
*B23K 1/005* (2006.01)
*B23K 26/70* (2014.01)
(Continued)

(52) U.S. Cl.
CPC .......... *B23K 1/0056* (2013.01); *B23K 1/0008* (2013.01); *B23K 26/032* (2013.01);
(Continued)

(58) Field of Classification Search
CPC .. B23K 1/0056; B23K 26/702; B23K 1/0008; B23K 26/032; B23K 26/0838;
(Continued)

(56) References Cited

U.S. PATENT DOCUMENTS 4,523,409 A * 6/1985 De Fazio ................ B24B 19/26
451/11
4,894,597 A * 1/1990 Ohtomi ..................... B24B 9/00
318/568.22
(Continued)

FOREIGN PATENT DOCUMENTS

CN       103042308 A    4/2013
JP       07-266210 A    10/1995
(Continued)

*Primary Examiner* — Tu B Hoang
*Assistant Examiner* — Masahiko Muranami
(74) *Attorney, Agent, or Firm* — Morgan, Lewis & Bockius LLP

(57) ABSTRACT

A roof laser brazing system comprises a side home position jig installed at each of opposite sides of the transferring path of the body in the brazing section, a roof-pressing jig detachably mounted on a handling robot, docked to the side home position jig, and that home-positions and presses the roof panel loaded on the opposite side panels, a brazing assembly mounted on at least one brazing robot in the side home position jig side and that brazes bonding portions between the opposite side panels and the roof panel using a laser as a heat source, and a grinding assembly mounted on the at least one grinding robot in the grinding section and that grinds brazing beads of the bonding portions between the opposite side panels and the roof panel.

10 Claims, 23 Drawing Sheets

(51) Int. Cl.
  *B23K 26/03*    (2006.01)
  *B23K 1/00*     (2006.01)
  *B23K 37/04*    (2006.01)
  *B23K 37/047*   (2006.01)
  *B23K 26/08*    (2014.01)
  *B23K 101/00*   (2006.01)
  *B23K 101/18*   (2006.01)
  *B23K 103/10*   (2006.01)

(52) U.S. Cl.
  CPC ...... *B23K 26/0838* (2013.01); *B23K 26/0884* (2013.01); *B23K 26/702* (2015.10); *B23K 37/047* (2013.01); *B23K 37/0443* (2013.01); *B23K 2101/006* (2018.08); *B23K 2101/18* (2018.08); *B23K 2103/10* (2018.08)

(58) Field of Classification Search
  CPC ............ B23K 26/0884; B23K 37/0443; B23K 37/047; B23K 2201/006; B23K 2201/18; B23K 2203/10; B23K 26/0861; B23K 26/12; B23K 26/127; B23K 2101/006; B25J 15/0066; B25J 21/00; G05B 19/4182; G05B 2219/45041; Y02P 90/083; B62D 65/024; B62D 65/10; B62D 65/12; B62D 65/18; B65D 65/18; B65G 41/003; B65G 49/00; B66F 7/12; B66F 7/14; B66F 3/46; Y10S 901/00; Y10S 901/41; Y10S 901/44; B24B 27/04; B24B 49/12
  USPC ............ 219/121.63, 121.82, 121.85, 121.86, 219/124.22, 124.4, 129, 136, 137 R, 158, 219/160, 162, 85.12, 85.13; 29/563; 250/239, 559.33; 901/42; 414/749.1; 228/47.1, 44.3; 451/6, 5, 8, 9, 10, 65; 382/141, 149, 150, 152, 153
  See application file for complete search history.

(56) References Cited

U.S. PATENT DOCUMENTS

| | | | | |
|---|---|---|---|---|
| 5,155,690 A * | 10/1992 | Nomaru | ............. | G05B 19/4083 29/407.08 |
| 5,477,268 A * | 12/1995 | Shimbara | ............. | B62D 65/005 348/125 |
| 5,533,146 A * | 7/1996 | Iwai | ............. | B23K 9/0956 219/121.63 |
| 6,344,629 B1 * | 2/2002 | Kato | ............. | B62D 65/02 218/147 |
| 2003/0057256 A1 * | 3/2003 | Nakamura | ............. | B62D 65/02 228/49.1 |
| 2005/0017057 A1 * | 1/2005 | Motomi | ............. | B23K 11/11 228/212 |
| 2005/0041852 A1 * | 2/2005 | Schwarz | ............. | B23K 9/0956 382/152 |
| 2006/0289393 A1 * | 12/2006 | Revel | ............. | B23K 9/173 219/75 |
| 2011/0210110 A1 * | 9/2011 | Dearman | ............. | B23K 9/0206 219/137 R |
| 2012/0125974 A1 * | 5/2012 | Kwon | ............. | B23K 11/11 228/8 |
| 2012/0318775 A1 * | 12/2012 | Schwarz | ............. | G01B 11/0608 219/121.63 |
| 2013/0031778 A1 * | 2/2013 | Magnano | ............. | B23K 37/0408 29/795 |

FOREIGN PATENT DOCUMENTS

| | | |
|---|---|---|
| KR | 10-1999-012178 A | 2/1999 |
| KR | 10-2000-0010504 A | 2/2000 |
| KR | 10-2009-0043181 A | 5/2009 |
| KR | 10-2009-0063998 A | 6/2009 |
| KR | 10-2013-0039955 A | 4/2013 |

* cited by examiner

300

700 ialROOF LASER BRAZING SYSTEM

CROSS-REFERENCE TO RELATED APPLICATION

This application claims the benefit of priority to Korean Patent Application No. 10-2015-0108918, filed with the Korean Intellectual Property Office on Jul. 31, 2015, the entire contents of which are incorporated herein by reference.

TECHNICAL FIELD

The present disclosure relates to a vehicle body assembly system. More particularly, the present disclosure relates to a roof laser brazing system that assembles side panels and a roof panel of a vehicle body.

BACKGROUND

Generally, a vehicle body is formed as a body in white (BIW) through a vehicle body assembly process of assembling various panels produced in vehicle body sub-processes.

A vehicle body includes a floor panel forming a lower side of a frame thereof, opposite side panels forming left and right sides of the frame, a roof panel forming an upper side of the frame, a plurality of roof rails, a cowl panel, a back panel, a package tray, and other components. Assembling such parts of the vehicle body is performed in a main buck process (referred to as a vehicle body build-up process in the industry).

In the main buck process, after the back panel is bonded to the floor panel through a vehicle body assembly system, the opposite side panels, the roof panel, the roof rail, the cowl panel and the package tray are welded and assembled.

The vehicle body assembly system sets the side panels to the floor panel by restricting the side panels by a side hanger and a side gate, and after it sets the roof panel, the roof rail, the cowl panel, and the package tray to the side panel, their bonding portions are welded by a welding robot.

In the vehicle body assembly process, after the roof panel is welded to the side panels by spot-welding, a roof molding made of resin is attached to the welded portions of the side panels and the roof panel.

However, since the roof molding is attached to the welded portions of the side panels and the roof panel in the conventional art, appearance thereof is not good, and material costs and labor costs may increase due to attachment of the roof molding.

The above information disclosed in this Background section is only to enhance the understanding of the background of the disclosure and therefore it may contain information that does not form the prior art that is already known in this country to a person of ordinary skill in the art.

SUMMARY OF THE DISCLOSURE

The present disclosure has been made in an effort to provide a roof laser brazing system that can remove a roof molding by laser-brazing portions between a side panel and a roof panel.

An exemplary embodiment of the present disclosure provides a roof laser brazing system which is configured in a predetermined brazing section and a predetermined grinding section along a transferring path of a body for bonding a roof panel to opposite side panels based on the body including the opposite side panels, including: a side home position jig that is installed at each of opposite sides of the transferring path of the body in the brazing section, and that restricts and home-positions the opposite side panels of the body; a roof-pressing jig that is detachably mounted on a handling robot, is docked to the side home position jig, and home-positions and presses the roof panel loaded on the opposite side panels; a brazing assembly that is mounted on at least one brazing robot in the side home position jig side and brazes bonding portions between the opposite side panels and the roof panel by using a laser as a heat source; and a grinding assembly that is mounted on the at least one grinding robot in the grinding section and grinds brazing beads of the bonding portions between the opposite side panels and the roof panel.

The roof laser brazing system may further include a gap measurement unit that is installed to be movable forward or backward to the brazing assembly and measures matching gaps between the roof panel and the opposite side panels pressed by the roof-pressing jig.

The side home position jig may home-position the opposite side panels depending on the matching gaps measured by the gap measurement unit, and may ensure a zero gap between the opposite side panels and the roof panel.

The roof laser brazing system may further include a bead inspection unit that is installed at the grinding assembly, inspects a brazing bead ground by the grinding assembly, and senses a position of the body.

The roof laser brazing system may further include: a roof alignment jig that is installed between the brazing section and the grinding section and aligns the roof panel; and a roof loading jig that is detachably installed at the handling robot, unloads the roof panel from the roof alignment jig, and loads the roof panel on the opposite side panels.

Another embodiment of the present disclosure provides a roof laser brazing system which laser-brazes a roof panel to opposite side panels based on a body including the opposite side panels, including: a side home position jig that is installed at each of opposite sides of a transferring path of the body in a brazing section set along the transferring path of the body and restricts the opposite side panels of the body; a roof-pressing jig that is detachably mounted on a handling robot, is docked to the side home position jig, and home-positions and presses the roof panel loaded on the opposite side panels; a brazing assembly that is mounted on at least one brazing robot in the side home position jig side and brazes bonding portions between the opposite side panels and the roof panel by using a laser as a heat source; a gap measurement unit that is mounted on the brazing assembly and measures matching gaps between the roof panel and the opposite side panels that are pressed by the roof-pressing jig; and a grinding assembly that is mounted on at least one grinding robot in a grinding section set along the transferring path of the body and grinds brazing beads of the bonding portions between the opposite side panels and the roof panel.

The side home position jig may include: a base frame installed at each of the opposite sides of the transferring path with the transferring path of the body therebetween; a moving frame installed to be reciprocally and slidably movable in a width direction of the body through a plurality of guide rails provided in the base frame; a post frame disposed in a direction perpendicular to opposite sides of the moving frame; a support frame installed at the post frame along a length direction of the opposite side panels; a plurality of clampers that are mounted on the support frame along the transfer direction of the body, are installed to be reciprocally movable in the width direction of the body, and restrict the opposite side panels; and a first driving part installed at the base frame to reciprocally move the moving frame in the width direction of the body.

The first driving part may include: a first servo motor fixedly mounted on the base frame; and a lead screw that is connected to the first servo motor and is substantially screw-fixed to the moving frame.

The clampers may be installed to be reciprocally movable in the width direction of the body by a second driving part provided in the support frame, and the second driving part may include: a second servo motor installed at the support frame; and an LM guide that is connected to the second servo motor, fixes the clamper, and is installed to be reciprocally movable in the width direction of the body by the second servo motor.

The post frame may include: a fixing pin coupled to fix the roof-pressing jig; a pin clamper installed to restrict a pin connection portion of the roof-pressing jig; and a support bracket at which the fixing pin and the pin clamper are installed and that is installed to dock with the roof-pressing jig.

The roof-pressing jig may include: a jig frame mounted on the handling robot; a restriction pad that is installed at each of left and right sides of the jig frame and supports opposite side edges of the roof panel along a length direction of the side panel; a plurality of vacuum cups that are installed at the jig frame, respectively pass through a plurality of penetration holes continuously formed in the restriction pad along the opposite side edges of the roof panel, and vacuum-adsorb skin surfaces the opposite side edges of the roof panel; a restriction pin that is installed to be vertically movable at the jig frame in a front end side of the restriction pad and is inserted upwardly from a lower side with respect to a restriction hole formed in the roof panel; a restriction pin cylinder that is connected to the restriction pin so that the restriction pin is vertically moved and is installed at the jig frame; a reference pin that is installed to be vertically movable at the jig frame in a rear end side of the restriction pad and is inserted downwardly from an upper side with respect to a reference hole formed in the roof panel; and a reference pin cylinder that is connected to the reference pin so that the reference pin is vertically moved and is installed at the jig frame.

A docking bracket docked to the side home position jig may be fixedly installed at opposite sides of each of front and rear ends of the jig frame, and a pin hole in which the fixing pin provided in the side home position jig is inserted may be formed in the docking bracket.

The brazing assembly may include: a brazing bracket mounted on the brazing robot; a laser head that is installed at the brazing bracket and irradiates a laser beam to the bonding portions between the opposite side panels and the roof panel; and a wire feeder that is provided in the brazing bracket and supplies a filler wire to a focus position of the laser beam.

The gap measurement unit may include a profile sensor that is installed at the brazing bracket, scans matching portions between the opposite side panels and the roof panel, and measures gaps of the matching portions.

An operating cylinder may be fixedly installed at the brazing bracket, and a sensor bracket to which the profile sensor is fixed may be connected to an operating rod of the operating cylinder.

The sensor bracket may include an air blower jetting air and an air jet passage connected to the air blower, and the air is jetted in a direction perpendicular to an irradiation direction of the laser beam through the air jet passage.

The grinding assembly may include: a grinding bracket mounted on the grinding robot; a grinding motor installed at the grinding bracket to be vertically movable; a grinding wheel coupled to a drive shaft of the grinding motor; a moving plate that is connected to the drive shaft of the grinding motor through a bushing and is installed at the grinding bracket to be vertically movable; a wheel cover that is mounted on the grinding bracket to cover the grinding wheel and at which an inlet sucking grinding-dust particles scattered by the grinding wheel is installed; a pressure control cylinder that is fixedly installed at the grinding bracket, is connected to the moving plate, and controls a grind-pressing force of the grinding wheel; and a stopper cylinder that is fixedly installed at the grinding bracket and selectively limits movement of the moving plate.

A pair of rail blocks may be vertically installed at the grinding bracket, a guide groove vertically guiding the bushing may be formed in the grinding bracket, the moving plate may be disposed between the grinding bracket and the wheel cover, and a sliding block slidably coupled to the rail block may be installed at the rail block.

The stopper cylinder may include an operating rod that passes through the grinding bracket and operates to move the moving plate forward or backward, and a friction pad may be installed at the moving plate corresponding to a front end of the operating rod.

The roof laser brazing system may further include a bead inspection unit that is installed at the grinding assembly, inspects brazing beads ground by the grinding assembly, and senses a position of the body, wherein the bead inspection unit may include: a mounting bracket installed at the grinding bracket; a vision camera that is installed at the mounting bracket and vision-photographs the ground brazing bead; and a profile sensor that is installed at the mounting bracket and scans the ground brazing bead to measure a height of the brazing bead.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Figure 1:
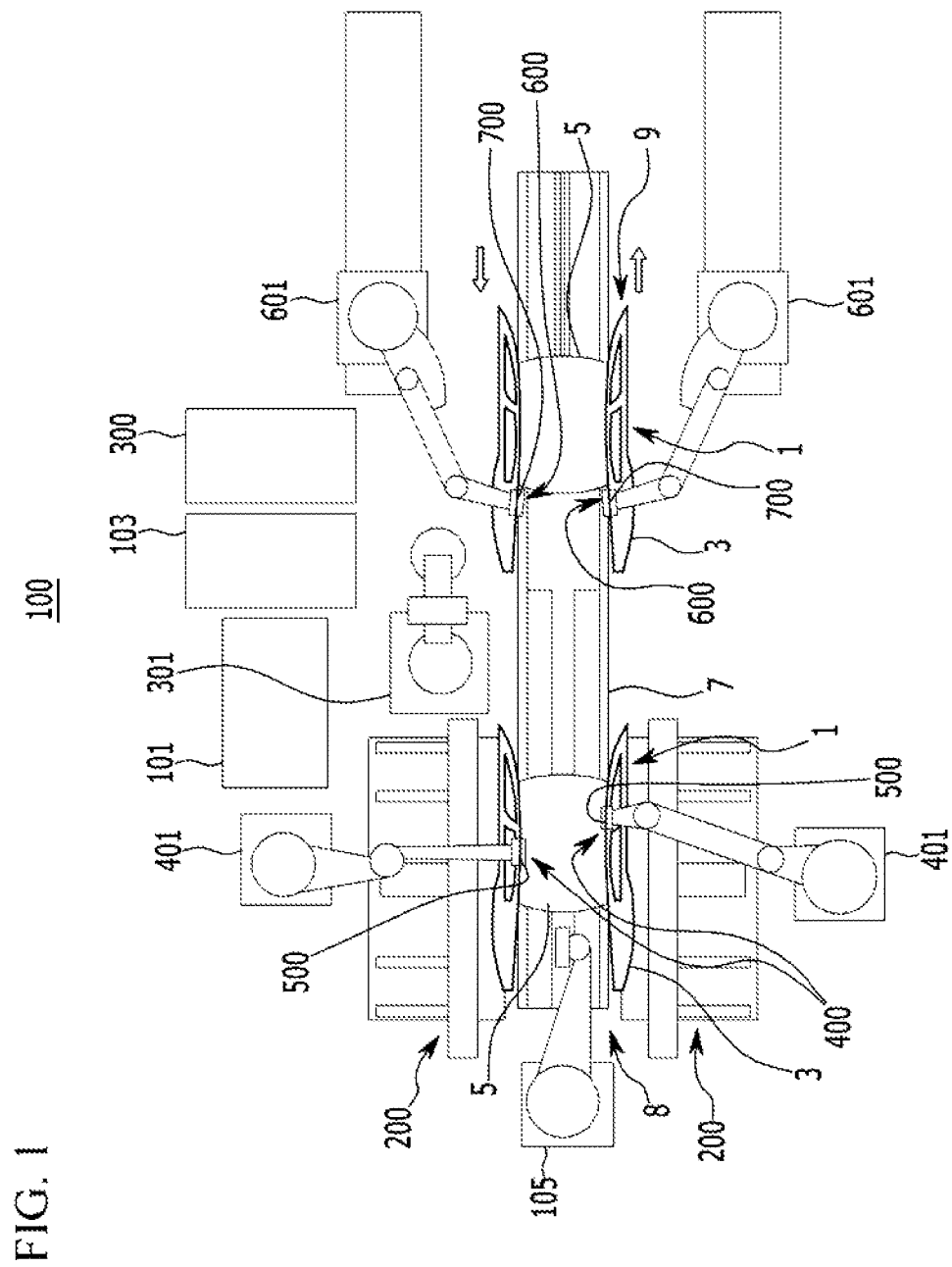
FIG. 1 schematically illustrates a block diagram of a roof laser brazing system according to an exemplary embodiment of the present disclosure.

FIG. 1 schematically illustrates a block diagram of a roof laser brazing system according to an exemplary embodiment of the present disclosure.

Referring to FIG. 1, a roof laser brazing system 100 according to an exemplary embodiment of the present disclosure restricts main buck assembly parts with a jig and welds them, and it may be applied to a main buck process of a vehicle body assembly line that assembles a vehicle body.

Further, the roof laser brazing system 100 according to the exemplary embodiment of the present disclosure may be applied to a process of bonding a roof panel 5 to opposite side panels 3 based on a body 1 including the opposite side panels 3 in the main buck process of the vehicle body assembly line.

Here, the body 1 may be one of which the opposite side panels 3 are assembled to a predetermined structure, for example, of which the side panels 3 are assembled to opposite sides of a floor panel (not shown). The body 1 may be transferred along a transfer line 7 by a carriage (not shown).

In the industry, a width direction of the body 1 is typically referred to as an L direction, a transfer direction of the body 1 as a T direction, and a height direction of the body 1 as an H direction. However, in the exemplary embodiment of the present disclosure, references to the directions are not set according to the LTH directions but are set as a width direction, a transfer direction, and a height direction of the body.

The roof laser brazing system 100 according to the exemplary embodiment of the present disclosure is configured in a structure in which portions at which the opposite side panels 3 and the roof panel 5 of the body 1 are bonded together by a laser-brazing method so that a roof molding may be removed.

Further, the roof laser brazing system 100 according to the exemplary embodiment of the present disclosure may be configured in a predetermined brazing section 8 and a predetermined grinding section 9 along a transfer path of the body 1.

For example, the roof laser brazing system 100 according to the exemplary embodiment of the present disclosure may bond the bonding portions between the opposite side panels 3 and the roof panel 5 of the body 1 by the laser-brazing method in the brazing section 8.

In addition, the roof laser brazing system 100 according to the exemplary embodiment of the present disclosure may grind brazing beads of the brazing portions between the opposite side panels 3 and the roof panel 5 in the grinding section 9.

For this purpose, the roof laser brazing system 100 according to the exemplary embodiment of the present disclosure may include side home position jigs 200, a roof-pressing jig 300, a brazing assembly 400, a gap measurement unit 500, a grinding assembly 600, and a bead inspection unit 700.

The above-described components may be totally installed in one process frame in the vehicle body assembly line of the main buck process, or may be separately installed in divided process frames therein.

In the exemplary embodiment of the present disclosure, the side home position jigs 200 are provided to restrict the opposite side panels 3 of the body 1 so that the opposite side panels 3 are positioned at predetermined positions, which are configured in the brazing section 8 and are installed at opposite sides of a transfer path of the body 1.

The side home position jigs 200, based on a body 1 of a predetermined type of vehicle that is transferred to the brazing section 8 by the transfer path of the transfer line 7, may clamp the opposite side panels 3 of the body 1 and may position the opposite side panels 3 at a predetermined position, which is a home position.

Further, the side home position jigs 200 may restrict the opposite side panels 3 to correspond to bodies 1 of different kinds of vehicles, and they may home-position the opposite side panels 3 at a predetermined position depending on a gap value between the side panels 3 and the roof panel 5 measured by a gap measurement unit 500 which will be described in detail later.

Here, the term, "home position" may be defined as a position at which the gap between the side panels 3 and the roof panel 5 becomes zero while the opposite side panels 3 are flowingly moved by the side home position jigs 200 in the width direction of the body 1.

For example, the side home position jigs 200 restrict the opposite side panels 3 and home-position the opposite side panels 3 depending on the gap value measured by the gap measurement unit 500, thereby ensuring a zero gap between the opposite side panels 3 and the roof panel 5. In addition, the term, "restriction" may be defined as clamping the opposite side panels 3.

In the exemplary embodiment of the present disclosure, the side home position jigs 200 are provided at the opposite sides of the transfer path with the transfer path of the body 1 therebetween. However, only one side home position jig 200 installed at one side of the transfer path will now be described.

Figure 2:
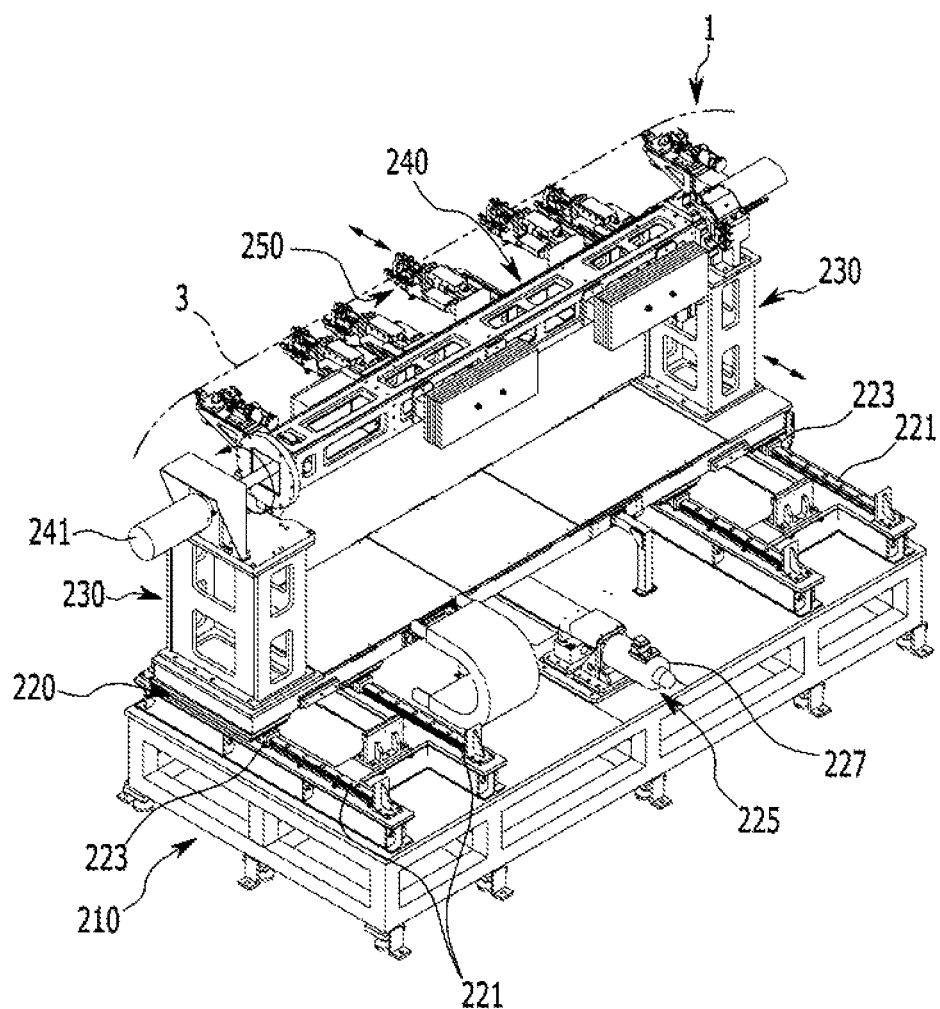
FIGS. 2 to 4 are drawings illustrating a side home position jig applied to a roof laser brazing system according to an exemplary embodiment of the present disclosure.
Figure 3:
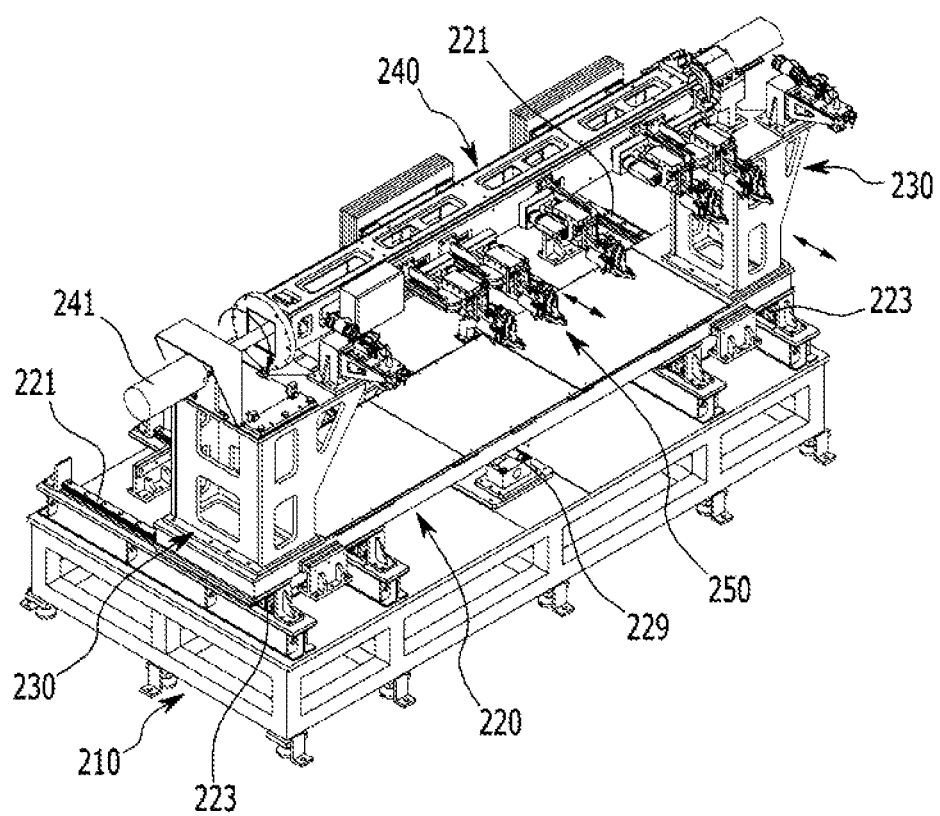
Figure 4:
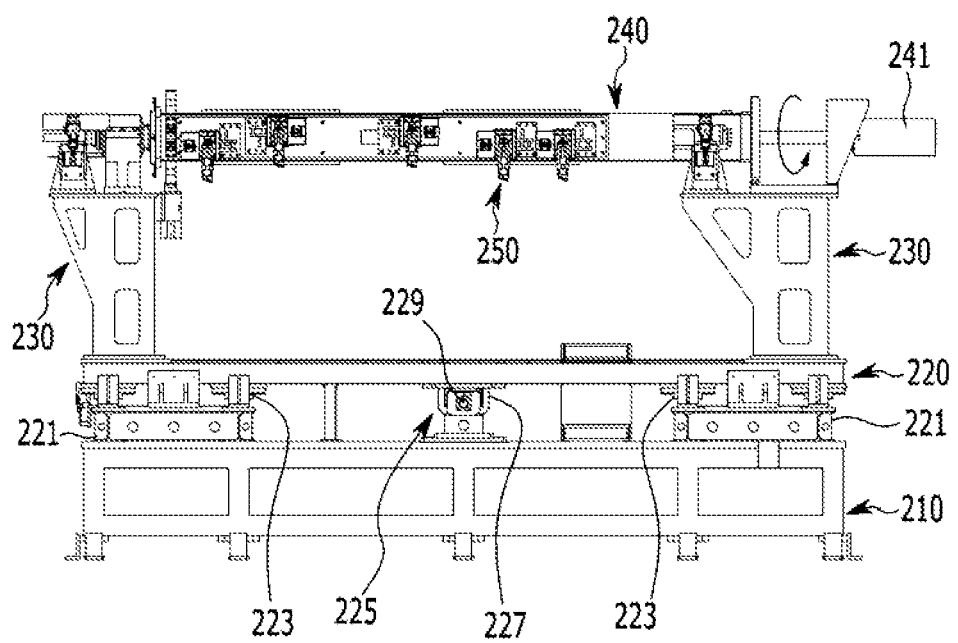

FIGS. 2 and 3 illustrate perspective view of a side home position jig applied to a roof laser brazing system according to an exemplary embodiment of the present disclosure, and FIG. 4 illustrates a side schematic diagram of a side home position jig applied to a roof laser brazing system according to an exemplary embodiment of the present disclosure.

Referring to FIGS. 2 to 4, a side home position jig 200 according to the exemplary embodiment of the present disclosure includes a base frame 210, a moving frame 220, a post frame 230, a support frame 240, and clampers 250.

The base frame 210 is provided to support the moving frame 220, the post frame 230, and the support frame 240, and is installed at the opposite sides of the transfer path with the transfer path of the body 1 therebetween in the brazing section 8.

The base frame 210 includes sub-elements such as various brackets, support blocks, plates, housings, covers, collars, and the like for supporting the moving frame 220. However, because the sub-elements are to install the moving frame 220 in the base frame 210, except for an exceptional case, the sub-elements are generally referred to as the base frame 210 in the exemplary embodiment of the present disclosure.

The moving frame 220 is installed at the base frame 210 to be reciprocally movable in the width direction of the body 1. The moving frame 220 is installed to be slidingly movable on a plurality of guide rails 221 provided in the base frame 210.

The guide rails 221 are spaced apart from each other by a predetermined distance along the transfer direction of the body 1, are installed on a top surface of the base frame 210, and are extendedly disposed in the width direction of the body 1. Sliders 223 are installed on a bottom surface of the moving frame 220. Each slider 223 is slidably coupled to a guide rail 221.

Here, a first driving part 225 for reciprocally moving the moving frame 220 in the width direction of the body 1 is installed at the base frame 210. The first driving part 225 is configured to be able to convert rotational motion of a motor into linear motion of the moving frame 220.

The first driving part 225 includes a first servo motor 227 that is installed at the base frame 210 and a lead screw 229 that is connected to the first servo motor 227 and is substantially screw-fixed to the moving frame 220.

The first servo motor 227 may be fixedly mounted on a top surface of the base frame 210. The lead screw 229 may be connected to a drive shaft of the first servo motor 227, and may be screw-fixed to a predetermined block (not shown) fixed to the bottom surface of the moving frame 220.

The post frame 230 is installed at each of the opposite sides of the moving frame 220 along the transfer direction of the body 1, and it is fixedly mounted in a vertical direction of the moving frame 220.

As a frame for substantially supporting clampers 250 that will be described later, the support frame 240 is extendedly disposed along a length direction of the opposite side panels 3, that is, along the transfer direction of the body 1, and is connected to the post frame 230.

The clampers 250 are provided to restrict the opposite side panels 3 and to home-position the opposite side panels 3 based on the gap value measured by the gap measurement unit 500.

The clampers 250 are provided in plural, mounted on the support frame 240 along the transfer direction of the body 1, and are installed to be reciprocally movable in the width direction of the body 1.

Figure 5:
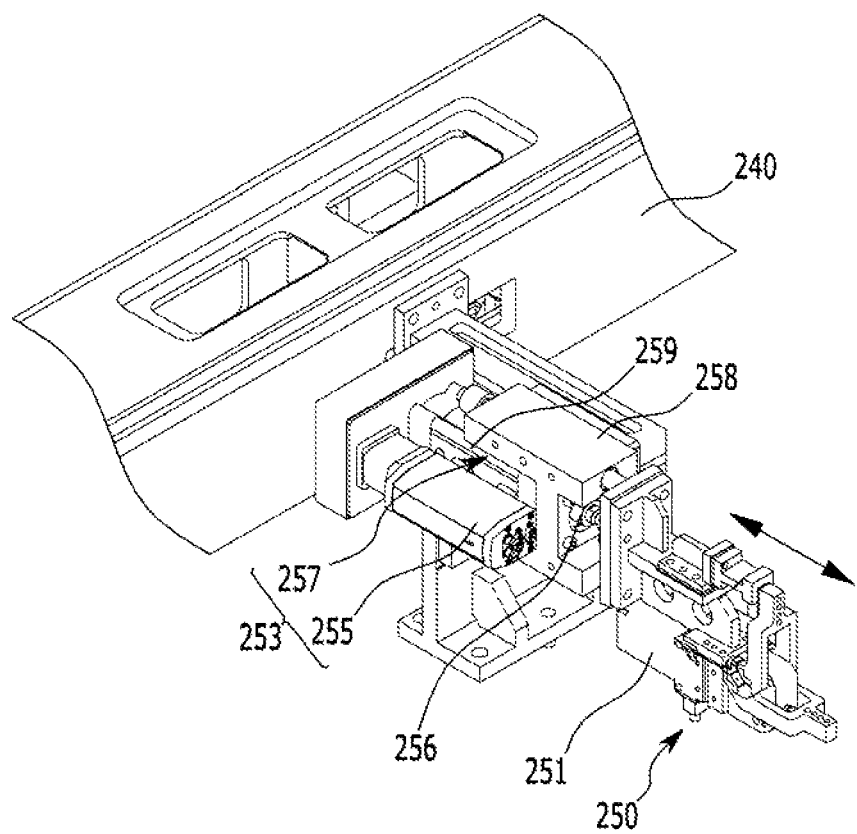
FIG. 5 illustrates a perspective view of a clamper of a side home position jig applied to a roof laser brazing system according to an exemplary embodiment of the present disclosure.

As a clamper for restricting upper sides of the opposite side panels 3, the clamper 250, as shown in FIG. 5, may be operated by a clamp cylinder 251 and may clamp the upper sides of the opposite side panels 3. Since the clamper 250 is configured as a clamping device based on well-known disclosed technologies in the art, a detailed description thereof will be omitted in the present specification.

As described above, the clamper 250 is installed to be reciprocally movable in the width direction of the body 1 at the support frame 240, and for this purpose, a second driving part 253 for reciprocally moving the clamper 250 in the width direction of the body 1 is provided in the support frame 240.

The second driving part 253 includes a second servo motor 255 that is installed at the support frame 240 and a linear motion (LM) guide 257 that is connected to the second servo motor 255 and fixes the clamper 250.

The second servo motor 255 is fixedly installed at the support frame 240. The LM guide 257 receives torque of the second servo motor 255 and reciprocally moves the clamper 250 in the width direction of the body 1 by the received torque.

The LM guide 257 may be connected to the second servo motor 255 through a power transmission unit such as a belt or a gear. The LM guide 257 includes a ball screw 256 connected to the drive shaft of the second servo motor 255, a moving block 258 screw-fixed to the ball screw 256 and connected to the clamper 250, and a rail member 259 slidably coupled to the moving block 258.

The clamper 250 may be linearly and reciprocally moved in the width direction of the body 1 through the LM guide 257 by rotating the second servo motor 255 in a forward or reverse direction.

As such, the reason that the clamper 250 is configured to be reciprocally movable in the width direction of the body 1 through the second driving part 253 is to flowingly move the opposite side panels 3 in the width direction of the body 1 in a state of restricting the opposite side panels 3 through the clamper 250.

For example, in the state of restricting the opposite side panels 3, the clamper 250 may flowingly move the opposite side panels 3 in the width direction of the body 1 through the second driving part 253 depending on the gap value measured by the gap measurement unit 500 such that the gap between the side panels 3 and the roof panel 5 may be zero.

In the present exemplary embodiment, as described above, the moving frame 220 being configured to be reciprocally movable in the width direction of the body 1 through the first driving part 225 moves the clampers 250 at predetermined positions corresponding to bodies 1 of different kinds of vehicles.

Further, in the present exemplary embodiment, the support frame 240 on which the clampers 250 is mounted may be rotatably installed at the post frame 230 through a drive motor 241.

The support frame 240 is rotatably supported by the post frame 230 and may be rotated by the drive motor 241. The drive motor 241 may be fixedly installed to the post frame 230 through a bracket.

The reason that the support frame 240 is configured to be rotatably installed at the post frame 230 through the drive motor 241 is to selectively use different structures of clampers 250 corresponding to bodies 1 of different kinds of vehicles depending on the corresponding vehicle.

Here, the clampers 250 may have different structures corresponding to the bodies 1 of respective kinds of vehicles to be able to respectively restrict the opposite side panels 3 of different kinds of vehicles, and may be installed at any side or at least one side of the support frame 240.

For example, the clampers 250 corresponding to one kind of vehicle are installed at one side of the support frame 240 along the transfer direction of the body 1, and the clampers 250 corresponding to each of different kinds of vehicles may be installed at another side of the support frame 240 along the transfer direction of the body 1.

In addition, since the support frame 240 is rotated by the drive motor 241, the clampers 250 of different structures corresponding to the bodies 1 of different kinds of vehicles are disposed at the side of opposite side panels 3 of the corresponding kind of vehicle.

Figure 6:
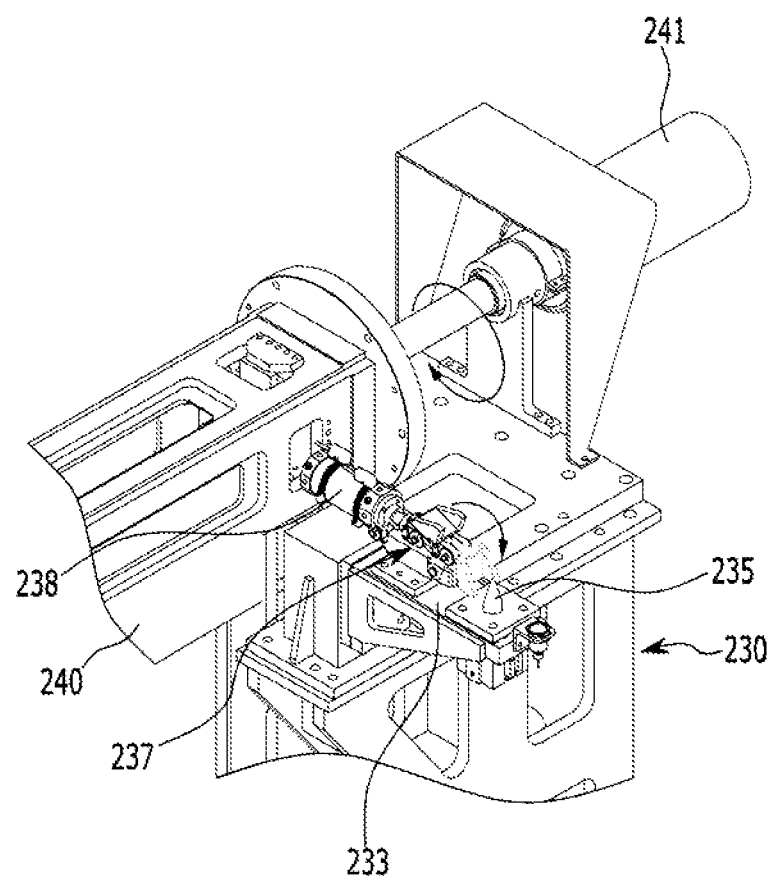
FIG. 6 illustrates a perspective view of a fixing pin of a side home position jig applied to a roof laser brazing system according to an exemplary embodiment of the present disclosure.

Further, as shown in FIG. 6, a support bracket 233 for docking with a roof-pressing jig 300 (refer to FIG. 1) that will be further described later is installed at each post frame 230.

A fixing pin 235 that is coupled to the roof-pressing jig 300 to fix the roof-pressing jig 300 is installed at the support bracket 233. The fixing pin 235 may be inserted into a docking portion of the roof-pressing jig 300 with respect to the support bracket 233.

A pin clamper 237 restricting a pin connection portion of the roof-pressing jig 300, that is, the docking portion, is installed at the support bracket 233 of the post frame 230. In the state in which the fixing pin 235 is coupled to the docking portion of the roof-pressing jig 300, the pin clamper 237 may restrict the fixing pin 235 together with the pin connection portion of the roof-pressing jig.

Here, the pin clamper 237 may rotate depending on an operation of a pin clamping cylinder 238, and may restrict the fixing pin 235 together with the pin connection portion of the roof-pressing jig 300 by an operating pressure of the pin clamping cylinder 238.

Referring to FIG. 1, in the exemplary embodiment of the present disclosure, the roof-pressing jig 300 is provided to home-position the roof panel 5 loaded on the opposite side panels 3 of the body 1 and to press the roof panel 5 with a handling robot 301. The roof-pressing jig 300 is detachably installed at the handling robot 301, and is configured to be able to be docked to the aforementioned side home position jig 200.

Here, the roof panel 5 may be aligned in a roof alignment jig 101, unloaded from the roof alignment jig 101 by a roof loading jig 103, and loaded on the opposite side panels 3 of the body 1.

The roof alignment jig 101 aligns the roof panel 5 at a predetermined position, and is installed between the brazing section 8 and the grinding section 9. The roof loading jig 103 is detachably installed at the aforementioned handling robot 301.

The roof alignment jig 101 includes a reference pin holding a reference position of the roof panel 5 and retainers supporting edges of the roof panel 5. The roof loading jig 103 includes a reference pin holding the reference position of the roof panel 5 and clampers restricting the edges of the roof panel 5.

Since configurations of the roof alignment jig 101 and the roof loading jig 103 are well known in the art, a detailed description thereof will be omitted in the present specification.

The handling robot 301 may tool-change the roof loading jig 103, the roof-pressing jig 300, and a spot-welding gun (not shown) through a tool-changer.

Reference number 105, which is shown in FIG. 1, denotes a welding robot in which the spot welding gun is mounted and which spot-welds the roof panel 5 and the front and rear roof rails, and the welding robot 105 is provided in the brazing section 8.

Figure 7:
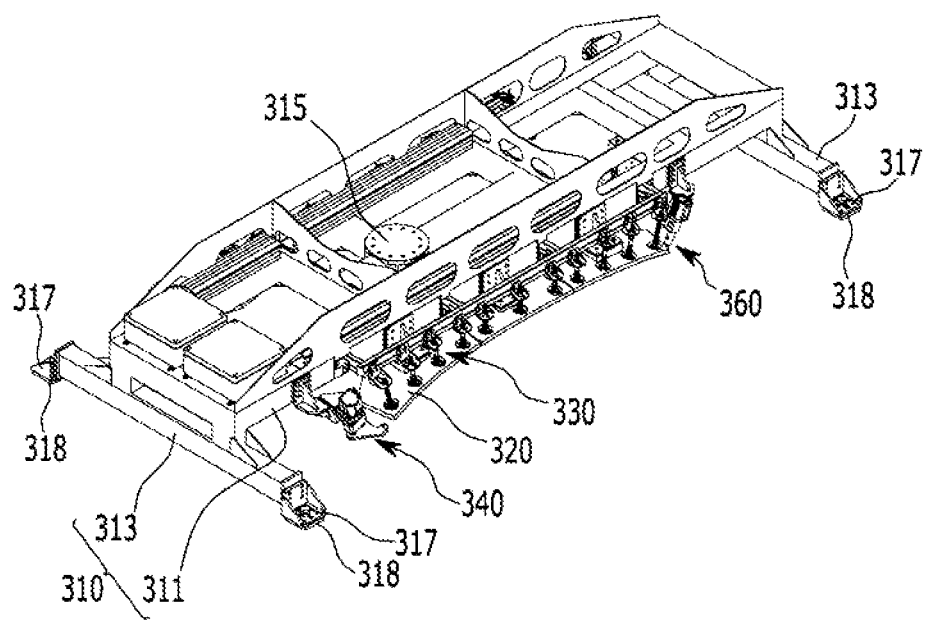
FIGS. 7 to 9 are drawings of illustrating a roof-pressing jig applied to a roof laser brazing system according to an exemplary embodiment of the present disclosure.
Figure 8:
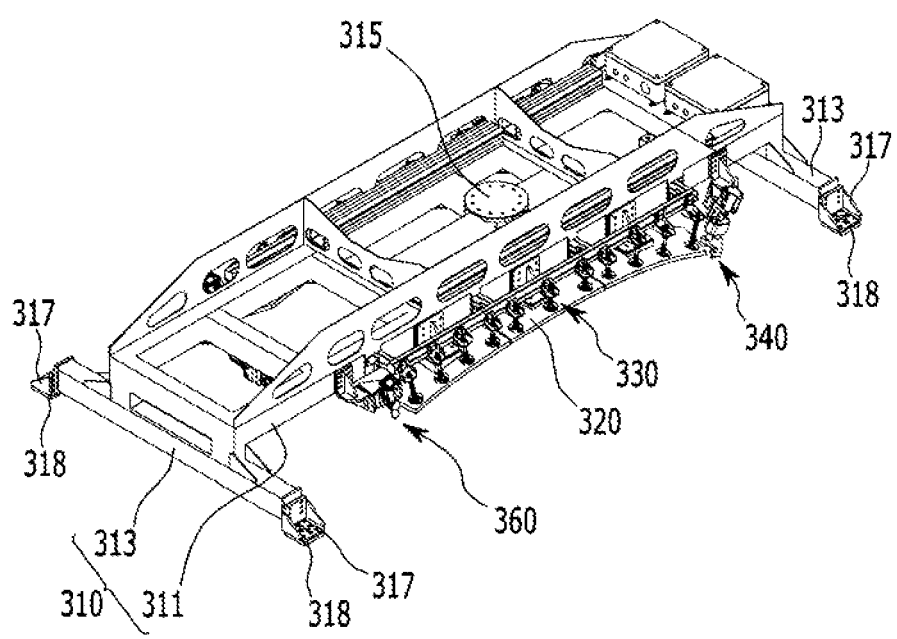
Figure 9:
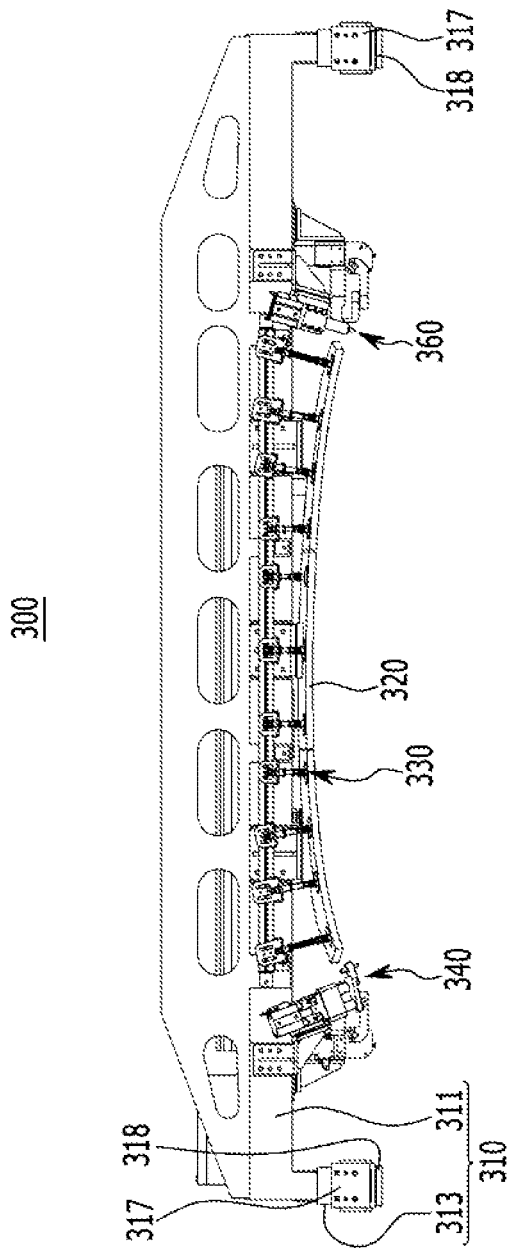

FIGS. 7 to 9 are drawings illustrating a roof-pressing jig applied to a roof laser brazing system according to an exemplary embodiment of the present disclosure.

Referring to FIGS. 7 to 9, a roof-pressing jig 300 according to the exemplary embodiment of the present disclosure includes a jig frame 310, a restriction pad 320, vacuum cups 330, a restriction pin 340, and a reference pin 360.

The jig frame 310 is detachably installed at an arm end of the handling robot 301. The jig frame 310 includes a main frame 311 and a sub-frame 313 integrally connected to a front end and a rear end of the main frame 311.

The main frame 311 is formed in a shape of a ladder, and includes a robot coupling part 315 combined with the arm end of the handling robot 301. The sub-frame 313 is formed in a '-'-shape, and is disposed at the front and rear ends of the main frame 311 along a left/right direction (width direction of the body).

Here, docking brackets 317 docked to the support bracket 233 of the aforementioned side home position jig 200 are fixedly installed at opposite sides of each of the front and rear jig frames 310, that is, at opposite sides of each sub-frame 313. A rubber pad 318 is installed at the bottom surface of the docking bracket 317. When the docking bracket 317 is docked to the support bracket 233, the rubber pad 318 serves to buffer impact of the docking bracket 317 with respect to the support bracket 233.

Figure 10:
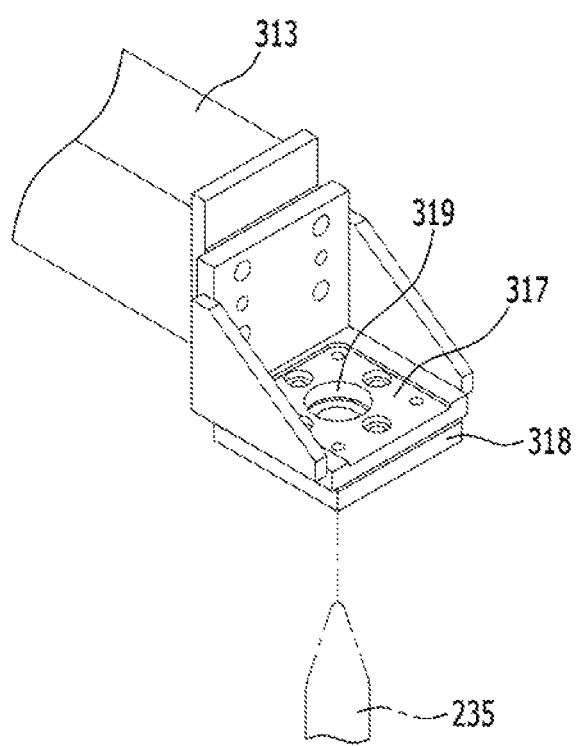
FIG. 10 illustrates a perspective view of a docking bracket of a roof-pressing jig applied to a roof laser brazing system according to an exemplary embodiment of the present disclosure.

As shown in FIG. 10, a pin hole 319 into which the fixing pin 235 of the side home position jig 200 is inserted is formed in the docking bracket 317. For example, when the docking bracket 317 is docked to the support bracket 233 of the side home position jig 200, the fixing pin 235 is combined with the pin hole 319 of the docking bracket 317.

The "docking" may be defined as a state in which the docking bracket 317 is positioned at the support bracket 233 when the roof-pressing jig 300 home-positions and presses the roof panel 5.

The restriction pad 320 supports the roof panel 5 loaded on the opposite side panels 3 of the body 1 and the opposite side edges of the roof panel 5 along the length direction of opposite side panels 3.

The restriction pad 320 is fixedly installed at each of the left and right sides of the main frame 311 of the jig frame 310, and is disposed along a length direction of the main frame 311. The restriction pad 320 is formed in a shape corresponding to the roof panel 5.

The restriction pad 320 is made of an aluminum material with excellent thermal conductivity so that the opposite side panels 3 and the roof panel 5 may not be overheated when they are bonded by laser brazing.

The vacuum cups 330 vacuum-adsorbs a skin surface of the opposite side edges of the roof panel 5, and is installed at the main frame 311 of the jig frame 310 corresponding to the restriction pad 320.

Figure 11:
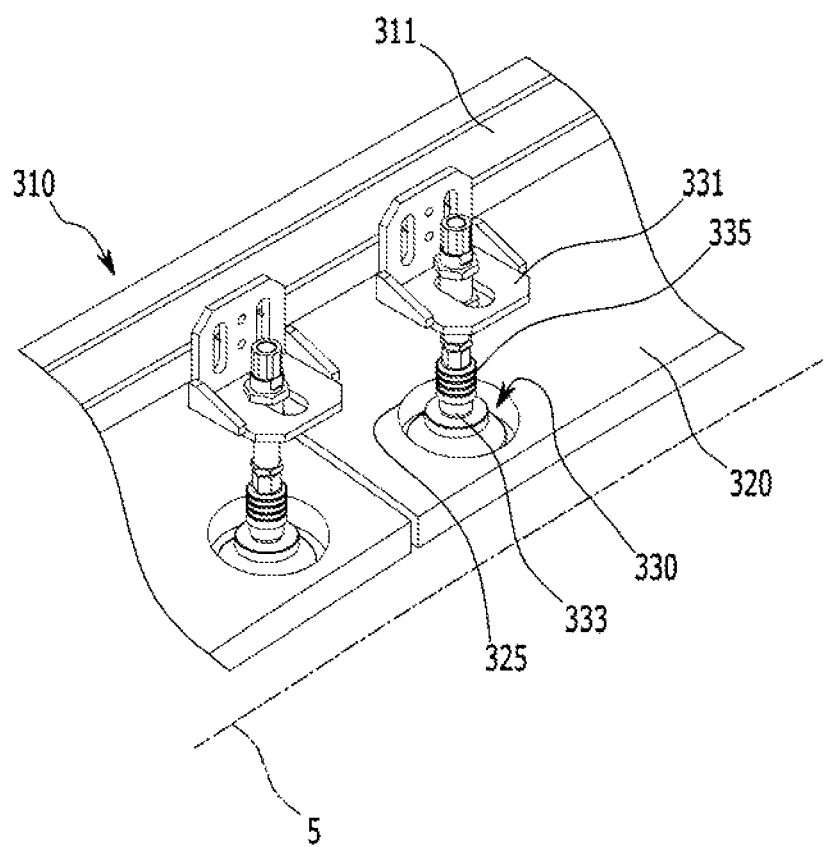
FIG. 11 illustrates a perspective view of a vacuum cup of a roof-pressing jig applied to a roof laser brazing system according to an exemplary embodiment of the present disclosure.

As shown in FIG. 11, the vacuum cups 330 pass through a plurality of penetration holes 325 that are continuously formed in the restriction pad 320 along the opposite side edges of the roof panel 5, and may vacuum adsorb the skin surface of the opposite side edges of the roof panel 5.

The vacuum cups 330 are installed to be spaced apart from each other in the main frame 311 of the jig frame 310 along the length direction of the main frame 311, and are installed through a fixing bracket 331 fixed to the main frame 311.

Here, a mounting rod 333 is fixedly installed at the fixing bracket 331. An upper end of the mounting rod 333 is fixed to the fixing bracket 331, and a lower end of the mounting rod 333 is disposed in a penetration hole 325 of the restriction pad 320. The vacuum cup 330 is installed at the lower end of the mounting rod 333. The vacuum cup 330 may be connected to the lower end of the mounting rod 333 through a spring 335.

Figure 12:
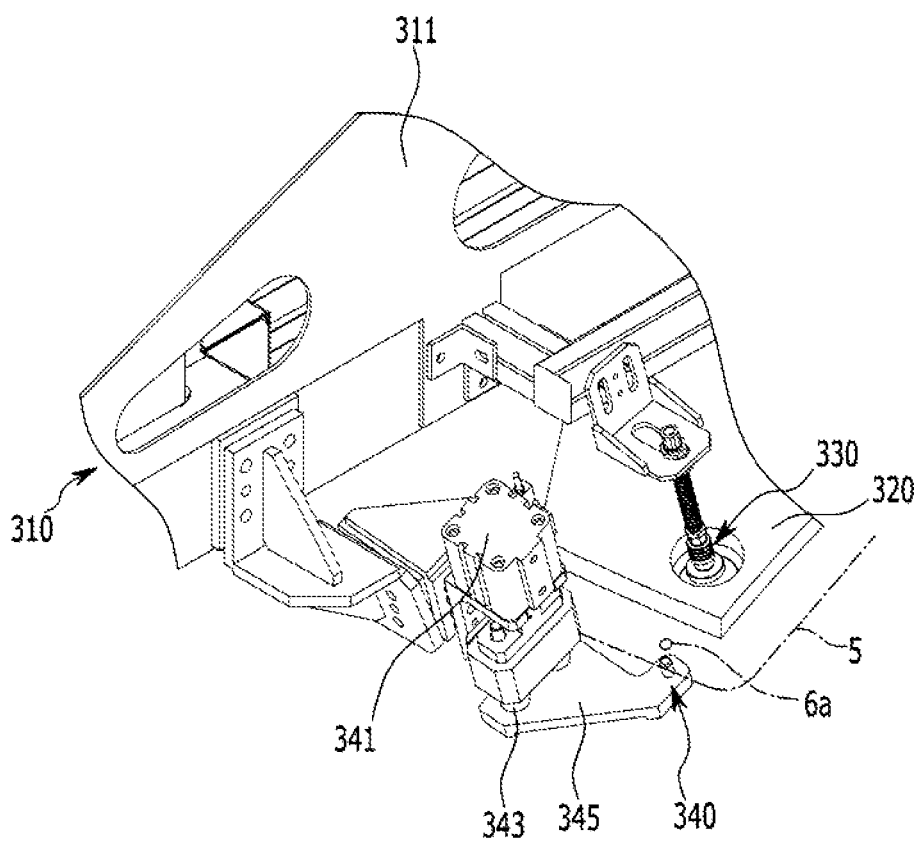
FIG. 12 illustrates a perspective view of a restriction pin of a roof-pressing jig applied to a roof laser brazing system according to an exemplary embodiment of the present disclosure.

As shown in FIG. 12, when the roof panel 5 is restricted through the restriction pad 320 and the vacuum cups 330, the restriction pin 340 is inserted into a restriction hole 6a formed in the roof panel 5 from an upper side thereof to a lower side thereof for restricting the roof panel 5. The restriction pin 340 is installed to be vertically movable at the main frame 311 of the jig frame 310 in a front end side of the restriction pad 320.

A restriction pin cylinder 341 is installed at the jig frame 310 so that the restriction pin 340 may be vertically reciprocally moved. The restriction pin cylinder 341 is connected to the restriction pin 340, and is fixedly installed at the main frame 311 of the jig frame 310.

The restriction pin cylinder 341 includes a restriction pin-operating rod 343 that is moved forward or backward by pneumatic pressure or hydraulic pressure. A restriction bracket 345 for supporting the bottom surface of the roof panel 5 and fixing the restriction pin 340 is installed at the restriction pin-operating rod 343. The restriction bracket 345 includes a flat top surface. The restriction pin 340 is fixedly installed at the top surface of the restriction bracket 345.

Accordingly, in the present exemplary embodiment, when the restriction pin-operating rod 343 of the restriction pin cylinder 341 upwardly moves backward in a state in which it has downwardly moved forward, the bottom surface of the roof panel 5 may be supported by the restriction bracket 345, and at the same time, the restriction pin 340 may be inserted into the restriction hole 6a of the roof panel 5 to restrict the roof panel 5.

Figure 13:
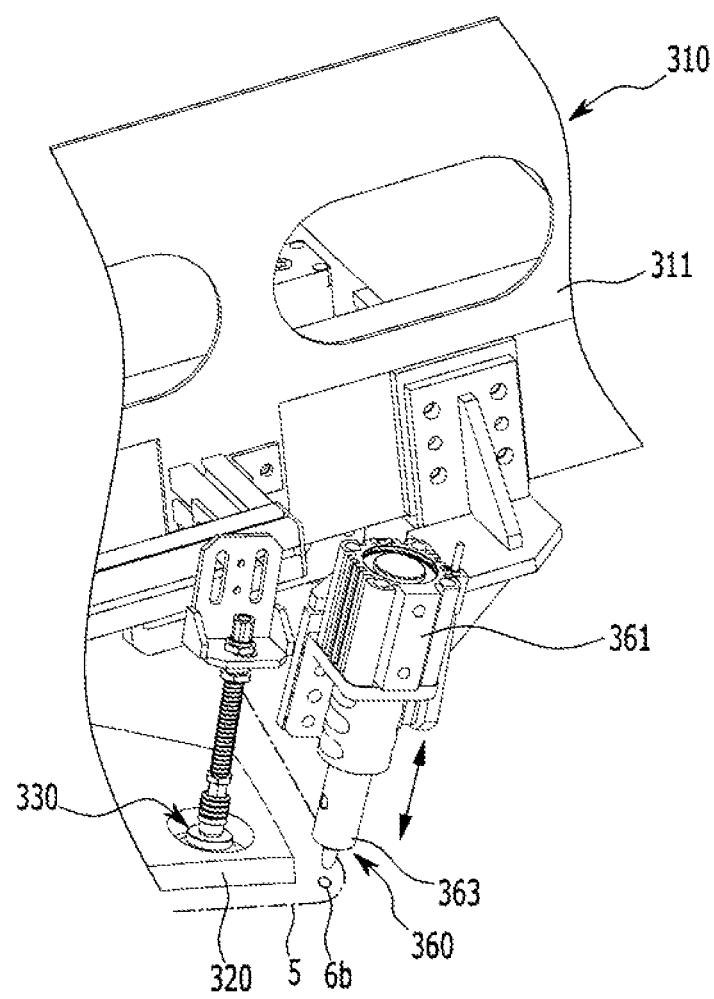
FIG. 13 illustrates a perspective view of a reference pin of a roof-pressing jig applied to a roof laser brazing system according to an exemplary embodiment of the present disclosure.

As shown in FIG. 13, when the roof panel 5 is restricted through the restriction pad 320, the vacuum cups 330, and the restriction pin 340, the reference pin 360 is inserted into a reference hole 6b formed in the roof panel 5 from a lower side thereof to an upper side thereof. The reference pin 360 is installed to be vertically movable at the main frame 311 of the jig frame 310 in a rear end side of the restriction pad 320.

A reference pin cylinder 361 is installed at the jig frame 310 so that the reference pin 360 may be vertically reciprocally moved. The reference pin cylinder 361 is connected to the reference pin 360, and is fixedly installed at the main frame 311 of the jig frame 310.

The reference pin cylinder 361 includes a reference pin-operating rod 363 that is moved forward or backward by pneumatic pressure or hydraulic pressure. The reference pin 360 is installed at the reference pin-operating rod 363.

Accordingly, in the present exemplary embodiment, while the roof panel 5 is restricted through the restriction pad 320, the vacuum cups 330, and the restriction pin 340, when the reference pin-operating rod 363 of the reference pin cylinder 361 downwardly moves forward in a state in which the reference pin-operating rod 363 of the reference pin cylinder 361 has upwardly moved backward, the reference pin 360 may be inserted into the reference hole 6b of the roof panel 5 to hold a reference position of the roof panel 5.

Figure 14:
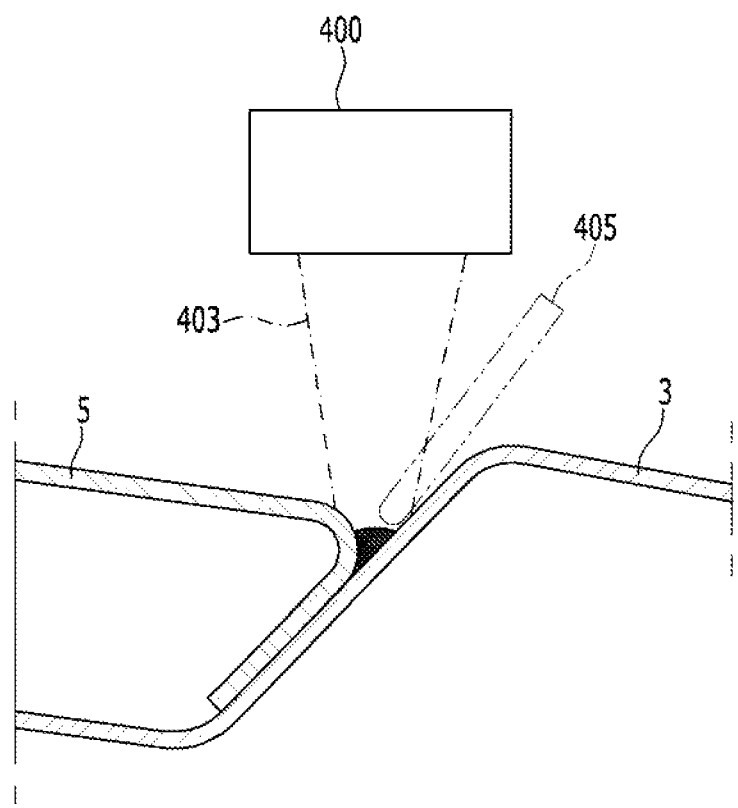
FIG. 14 illustrates a schematic diagram for a laser brazing principle of a brazing assembly applied to a roof laser brazing system according to an exemplary embodiment of the present disclosure.

As shown in FIGS. 1 and 14, in the exemplary embodiment of the present disclosure, the brazing assembly 400 brazes the bonding portions between the opposite side panels 3 and the roof panel 5 that are closely pressed to each other by the roof-pressing jig 300 while using a laser which is a heating source.

The brazing assembly 400 is installed at each of a pair of brazing robots 401 in the side home position jig 200 side of the brazing section 8. A brazing robot 401 is installed at each of the side home position jigs 200 side with the transfer path of the body 1 therebetween.

Here, the brazing assembly 400 may melt a filler metal by using a laser as a heating source, and may braze the bonding portions between the opposite side panels 3 and the roof panel 5.

For example, the brazing assembly 400 may irradiate continuous wave Nd:YAG laser beams 403 oscillated by a laser oscillator to the bonding portions between the opposite side panels 3 and the roof panel 5 to melt a filler wire 405 of the filler metal, thereby brazing the bonding portions between the opposite side panels 3 and the roof panel 5.

Figure 15:
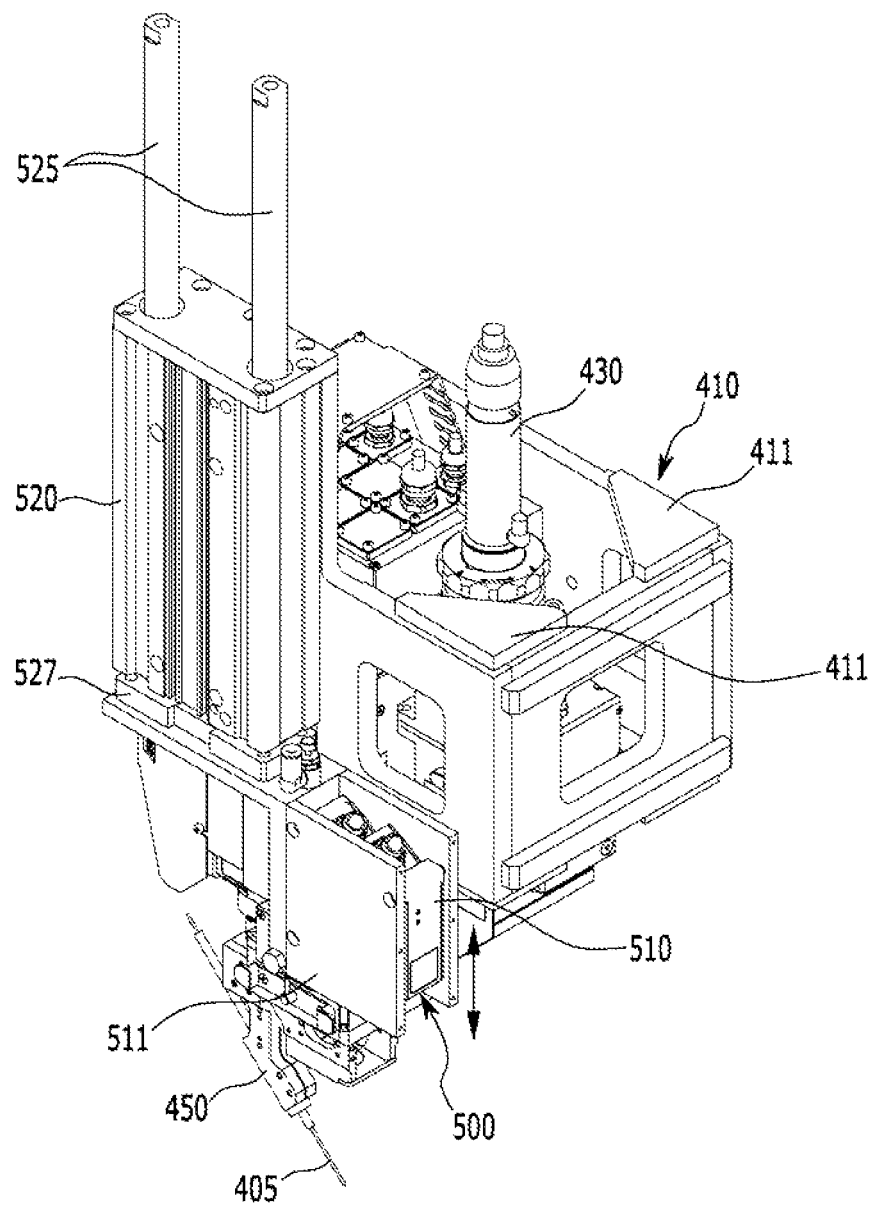
FIGS. 15 to 17 are drawings of illustrating a brazing assembly and a gap measurement unit that are applied to a roof laser brazing system according to an exemplary embodiment of the present disclosure.
Figure 16:
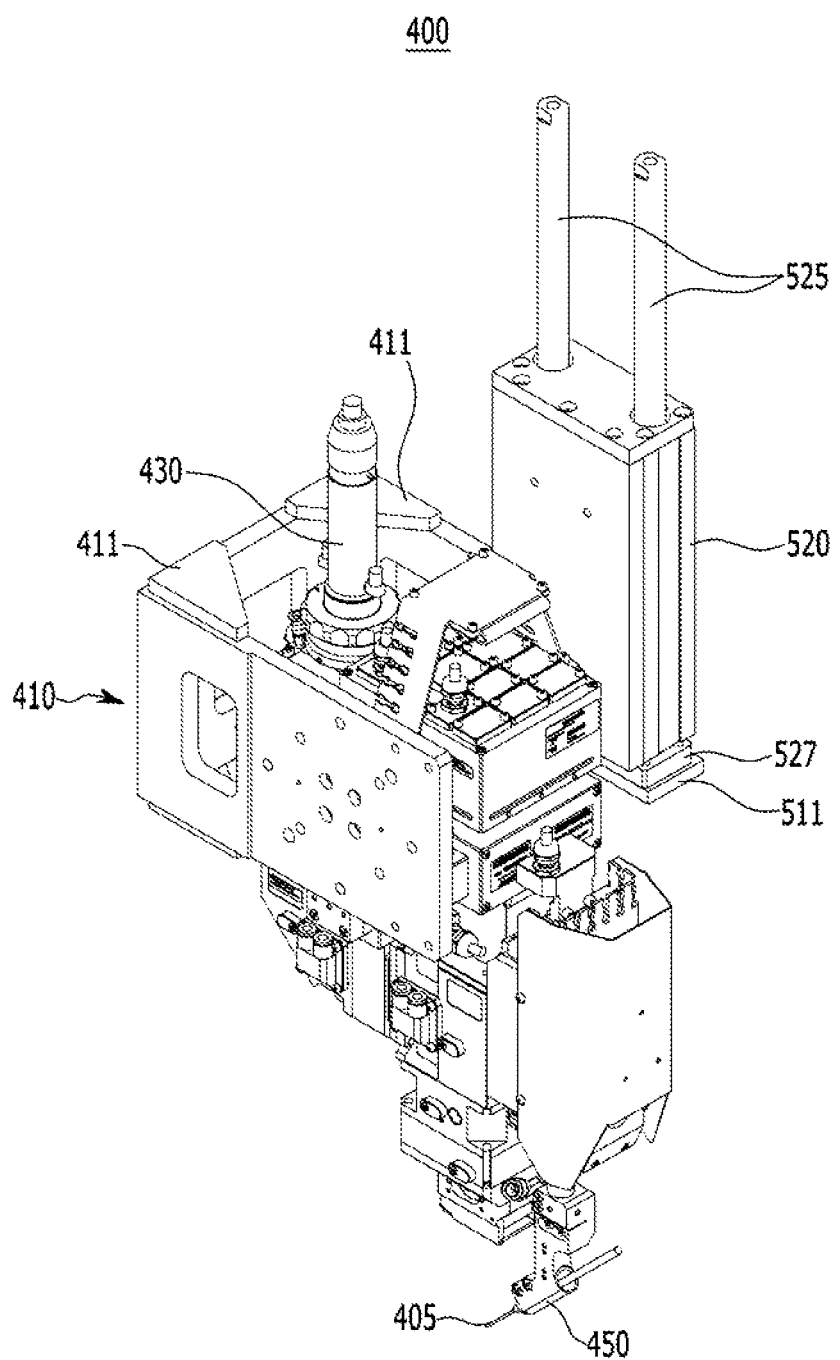
Figure 17:
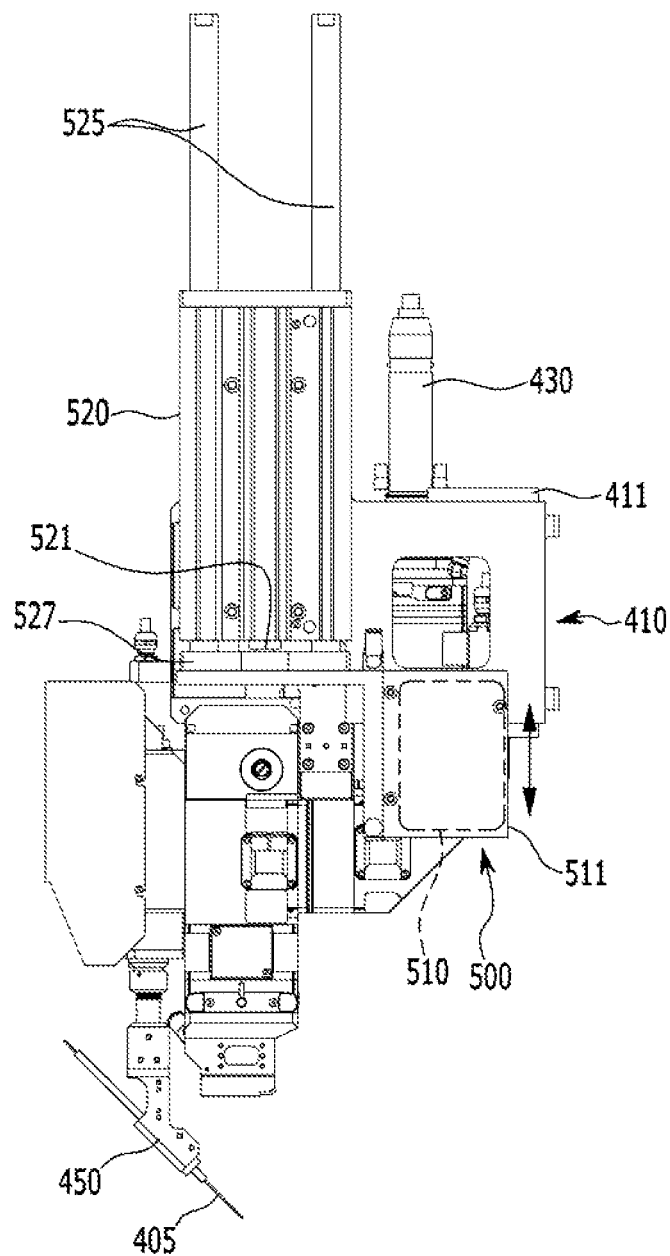

FIGS. 15 to 17 are drawings illustrating a brazing assembly and a gap measurement unit that are applied to a roof laser brazing system according to an exemplary embodiment of the present disclosure.

Referring to FIGS. 15 to 17, a brazing assembly 400 according to the exemplary embodiment of the present disclosure includes a brazing bracket 410, a laser head 430, and a wire feeder 450.

The brazing bracket 410 is installed at the arm front end of the brazing robot 401. The brazing bracket 410 is provided to be rotatable by the brazing robot 401, and may be transferred along the bonding portions between the opposite side panels 3 and the roof panel 5 by the brazing robot 401.

The brazing bracket 410 is directly mounted on the arm of the brazing robot 401 by considering characteristics of the laser head 430 that is susceptible to an external factor such as vibration. The brazing bracket 410 is substantially formed in a " ⌐ "-shape, and includes reinforcing plates 411 installed at the edges thereof for reducing weakness of the edges thereof.

The laser head 430 irradiates laser beams to the bonding portions between the opposite side panels 3 and the roof panel 5, and is installed at the brazing bracket 410. The laser head 430 may be a Nd:YAG optical head irradiating continuous wave Nd:YAG laser beams oscillated by a laser oscillator controlled by a controller along the bonding portions between the opposite side panels 3 and the roof panel 5.

Here, the laser oscillated by the laser oscillator is irradiated to the bonding portions between the opposite side panels 3 and the roof panel 5 from the laser head 430 in a state of being focused by an optical system.

The wire feeder 450 feeds the filler wire 405 of the filler metal to a focus position of the laser beam that is irradiated from the laser head 430. The wire feeder 450 is provided in the brazing bracket 410.

Since the laser head 430 and the wire feeder 450 are configured as a laser optical head device and a wire feeder based on the well-known disclosed technologies in the art, a detailed description thereof will be omitted in the present specification.

Referring to FIG. 1 and FIGS. 15 to 17, a gap measurement unit 500 according to an exemplary embodiment of the present disclosure measures matching gaps between the roof panel 5 and the opposite side panels 3 that are pressed by the roof-pressing jig 300 before laser-brazing the opposite side panels 3 and the roof panel 5 through the laser head 430 and the wire feeder 450 of the brazing assembly 400.

The gap measurement unit 500 measures the matching gaps between the roof panel 5 and the opposite side panels 3 pressed by the roof-pressing jig 300 and outputs the measured values to a controller (not shown).

Here, the controller may control an operation of the side home position jig 200 depending on the matching gap values between the roof panel 5 and the opposite side panels 3 measured by the gap measurement unit 500.

For example, the controller applies a control signal to the second driving part 253 of the side home position jig 200 depending on the gap values between the roof panel 5 and the opposite side panels 3 measured by the gap measurement unit 500 to be able to move the clampers 250 of the side home position jig 200 restricting the opposite side panels 3 in the width direction of the body 1.

Accordingly, in the exemplary embodiment of the present disclosure, based on the gap values between the roof panel 5 and the opposite side panels 3 measured by the gap measurement unit 500, it is possible to flowingly move and home-position the opposite side panels 3 in the width direction of the body 1 through the side home position jig 200, and the gaps between the opposite side panels 3 and the roof panel 5 may be zero.

The gap measurement unit 500 is installed at the brazing bracket 410 of the brazing assembly 400. The gap measurement unit 500 includes a first profile sensor 510 that scans matching portions between the opposite side panels 3 and the roof panel 5 and measures gaps of the matching portions.

The first profile sensor 510 scans the matching portions between the opposite side panels 3 and the roof panel 5 with a laser slit, and measures the gaps of the matching portions. For example, the first profile sensor 510 sets a virtual reference line based on a straight-line portion of the roof panel 5, and calculates a distance between profiles generated on the virtual reference line, thereby measuring the matching gaps between the roof panel 5 and the opposite side panels 3.

Since the profile sensor is configured as a profile sensor based on the well-known disclosed technologies, a detailed description thereof will be omitted in the present specification.

Here, the first profile sensor 510 is installed at the brazing bracket 410 of the brazing assembly 400 side through a sensor bracket 511. The sensor bracket 511 fixes the first profile sensor 510, and is installed to be able to be moved forward or backward with respect to the brazing bracket 410.

For this purpose, an operating cylinder 520 is fixedly installed at the brazing bracket 410. The operating cylinder 520 includes an operating rod 521 that is moved forward or backward by a pneumatic pressure or a hydraulic pressure operating rod 521. The sensor bracket 511 to which the first profile sensor 510 is fixed is connected to a front end of the operating rod 521. Accordingly, the sensor bracket 511 may be moved forward or backward by the operating cylinder 520.

In addition, a pair of guide bars 525 for guiding the sensor bracket 511 that is moved forward or backward by the operating rod 521 is installed at the operating cylinder 520. A guide bar 525 is slidably inserted in a body of the operating cylinder 520, and is coupled to a front end of the operating rod 521 through a fixing block 527. The fixing block 527 connects the front end of the operating rod 521 and a front end (lower end in the drawing) of the guide bar 525, and is fixed to the sensor bracket 511.

The sensor bracket 511 may move forward through the operating cylinder 520 to measure the matching gaps between the roof panel 5 and the opposite side panels 3 through the first profile sensor 510, before laser-brazing the opposite side panels 3 and the roof panel 5 through the brazing assembly 400.

When the opposite side panels 3 and the roof panel 5 are laser-brazed by the brazing assembly 400, the sensor bracket 511 is moved backward by the operating cylinder 520, thereby preventing interference with the brazing assembly 400.

Figure 18:
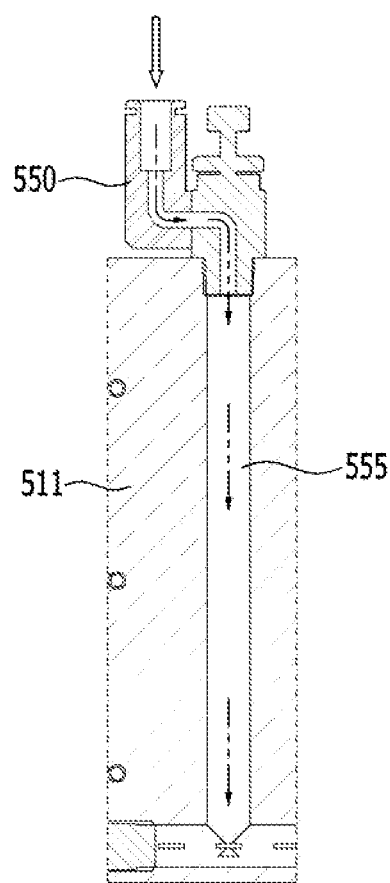
FIG. 18 is a drawing of illustrating an air jet structure for a brazing assembly applied to a roof laser brazing system according to an exemplary embodiment of the present disclosure.

As shown in FIG. 18, when the opposite side panels 3 and the roof panel 5 are laser-brazed by the brazing assembly 400, an air blower 550, which jets air into the brazing portions between the opposite side panels 3 and the roof panel 5, is installed in the sensor bracket 511.

That is, the air blower 550 jets air to the brazing portion sides between the opposite side panels 3 and the roof panel 5 to prevent a foreign material from being attached to the laser-brazing portions between the opposite side panels 3 and the roof panel 5.

The air blower 550 receives air of a predetermined pressure supplied by an air compressor (not shown) to be able to jet the air into the brazing portions between the opposite side panels 3 and the roof panel 5.

For example, the air blower 550 may jet air in a direction perpendicular to the irradiated direction of the laser beam irradiated from the laser head 430 of the brazing assembly 400.

For this purpose, an air jet passage 555 connected to the air blower 550 is formed in the sensor bracket 511. The air jet passage 555 is formed along the irradiated direction of the laser beam irradiated from the laser head 430, and is provided with a passage opened in the direction perpendicular to the irradiated direction of the laser beam.

Referring to FIG. 1, in the exemplary embodiment of the present disclosure, the grinding assembly 600 grinds brazing beads (not shown) of the brazing portions between the opposite side panels 3 and the roof panel 5 that are laser-brazed by the brazing assembly 400.

The grinding assembly 600 may grind the brazing beads in a state in which the opposite side panels 3 and the roof panel 5 are completely laser-brazed by the brazing assembly 400 in the brazing section 8 of the body transfer path and then the body 1 is transferred in the grinding section 9 along the body transfer path.

Here, the grinding assembly 600 is provided in each of a pair of grinding robots 601 in the grinding section 9 of the body transfer path. The grinding robots 601 are respectively installed at opposite sides of the transfer path of the body 1 with the transfer path of the body 1 therebetween.

In this case, the grinding assembly 600 may be moved along a predetermined teaching path by a grinding robot 601, and may grind the brazing beads of the brazing portions of the opposite side panels 3 and roof panel 5.

Figure 19:
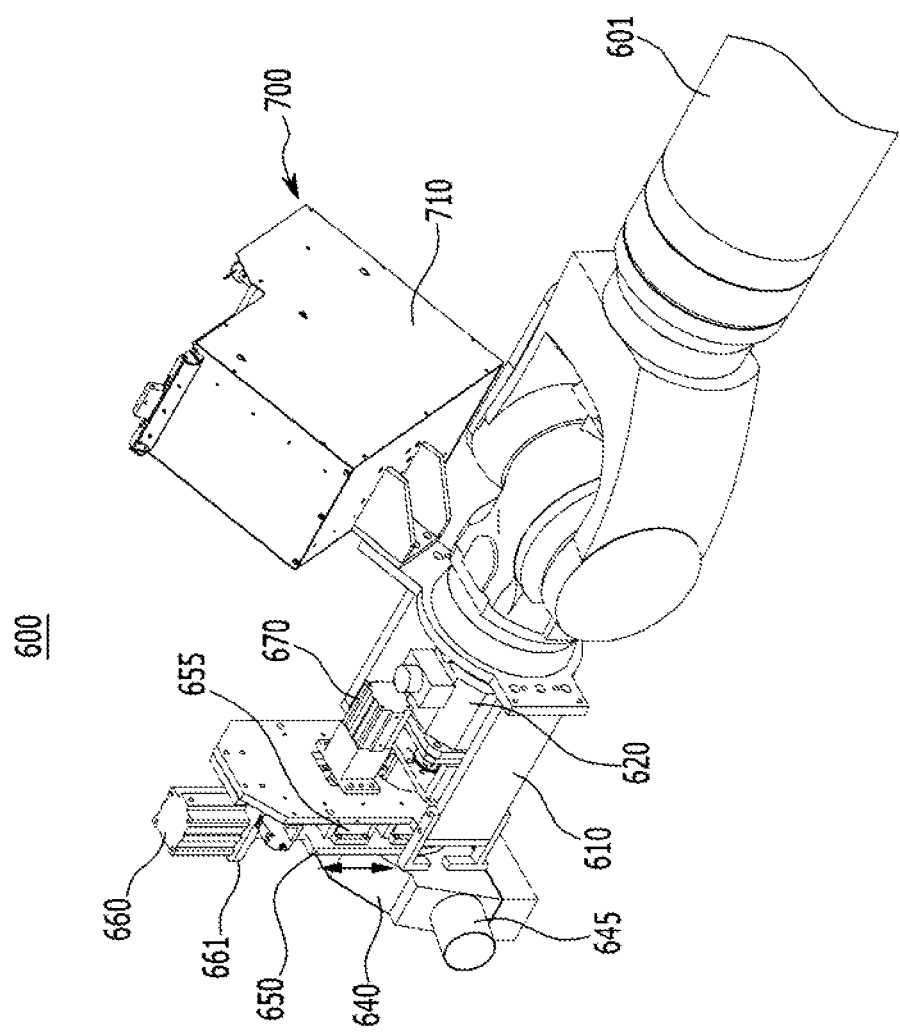
FIGS. 19 and 20 illustrate a combined perspective views of a grinding assembly applied to a roof laser brazing system according to an exemplary embodiment of the present disclosure.
Figure 20:
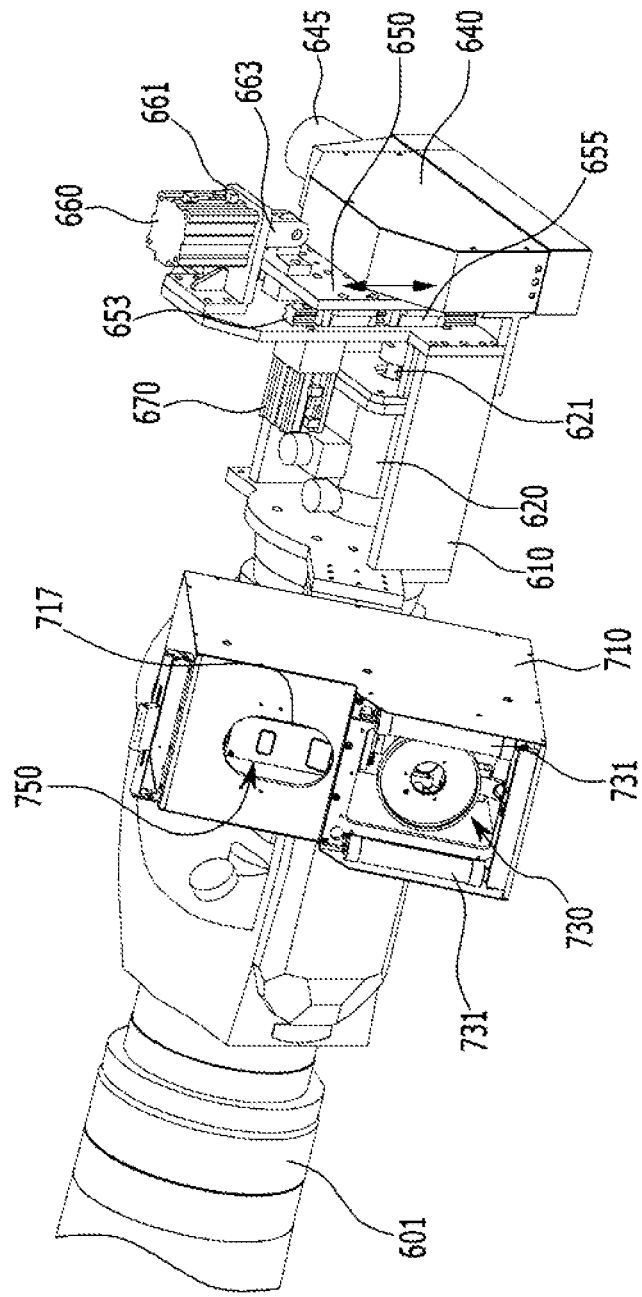
Figure 21:
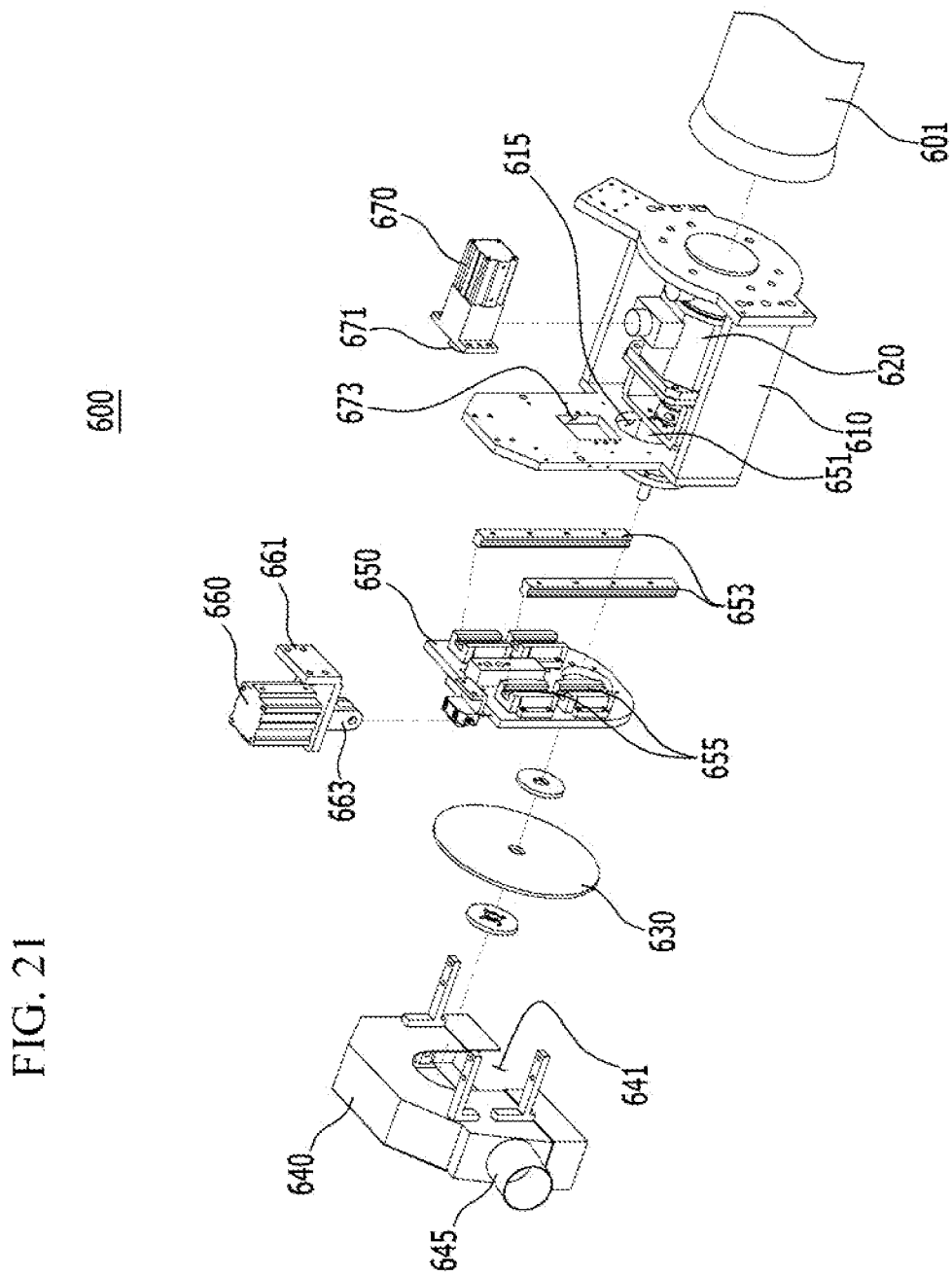
FIG. 21 illustrates an exploded perspective view of a grinding assembly applied to a roof laser brazing system according to an exemplary embodiment of the present disclosure.
Figure 22:
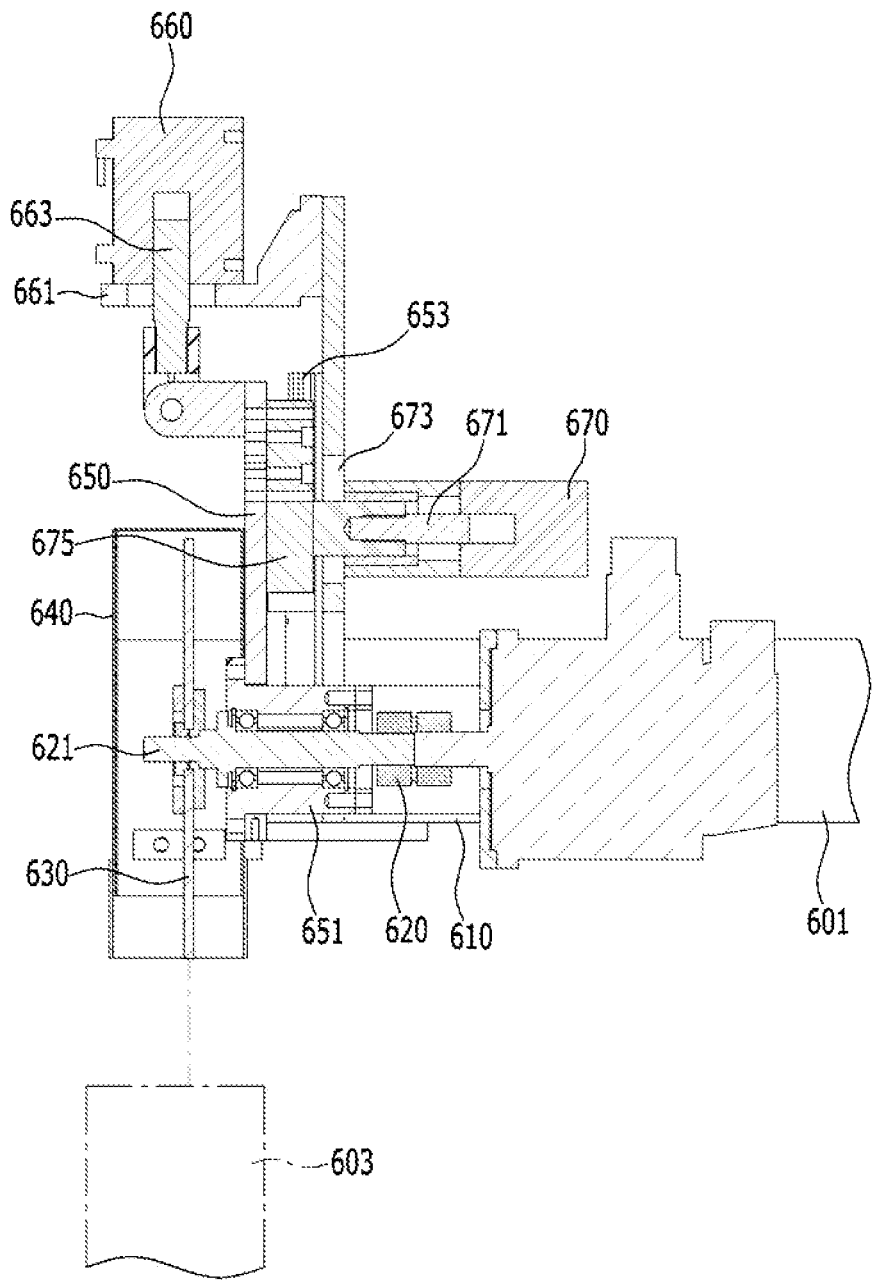
FIG. 22 illustrates an assembled cross-sectional view of a grinding assembly applied to a roof laser brazing system according to an exemplary embodiment of the present disclosure.

FIGS. 19 and 20 illustrate a combined perspective views of a grinding assembly applied to a roof laser brazing system according to an exemplary embodiment of the present disclosure, FIG. 21 illustrates an exploded perspective view of a grinding assembly applied to a roof laser brazing system according to an exemplary embodiment of the present disclosure, and FIG. 22 illustrates an assembled cross-sectional view of a grinding assembly applied to a roof laser brazing system according to an exemplary embodiment of the present disclosure.

Referring to FIG. 1 and FIGS. 19 to 22, a grinding assembly 600 according to an exemplary embodiment of the present disclosure includes a grinding bracket 610, a grinding motor 620, a grinding wheel 630, a wheel cover 640, a moving plate 650, a pressure control cylinder 660, and a stopper cylinder 670.

The grinding bracket 610 is mounted on an arm front end of the grinding robot 601 to be rotatable by the grinding robot 601, and may be transferred along the bonding portions between the opposite side panels 3 and the roof panel 5 by the grinding robot 601.

The grinding motor 620 rotates the grinding wheel 630 that will be further described later, and is installed to be movable in a vertical direction of the grinding bracket 610 with reference to the drawing.

The grinding wheel 630 is provided to grind the brazing beads of the laser-brazed opposite side panels 3 and roof panel 5. The grinding wheel 630 is formed in a disc shape, and may be coupled to a drive shaft 621 of the grinding motor 620 to be rotated.

The wheel cover 640, which covers the grinding wheel 630, serves to collect grinding-dust particles scattered when the brazing beads of the bonding portions of the opposite side panels 3 and roof panel 5 are ground through the grinding wheel 630 without disturbing vertical movement of the grinding motor 620.

The wheel cover 640 is formed as a housing, a lower portion of which is opened while it wholly surrounds the grinding wheel 630 coupled to the drive shaft 621 of the grinding motor 620, and is fixedly mounted on the grinding bracket 610.

Here, the grinding wheel 630 is rotated by the grinding motor 620 inside the wheel cover 640, and may grind the brazing beads through the lower opened portion of the wheel cover 640.

A first guide groove 641 guiding the vertical movement of the grinding motor 620 to not disturb the vertical movement of the grinding motor 620 is formed in the wheel cover 640. The first guide groove 641 is formed in one surface of the wheel cover 640 fixed to the grinding bracket 610 in the upper direction from the lower opened portion of the wheel cover 640.

Further, an inlet 645 for sucking the grinding-dust particles scattered when the brazing beads of the bonding portions of the opposite side panels 3 and roof panel 5 are ground through the grinding wheel 630, is installed at the wheel cover 640.

The inlet 645 sucks the grinding-dust particles scattered inside the wheel cover 640 and exhausts them outside the wheel cover 640 and, for example, may be connected to a vacuum pump (not shown) through a dust particle exhaust line (not shown).

The moving plate 650, which supports the grinding motor 620 with respect to the grinding bracket 610 and guides the vertical movement of the grinding motor 620, is installed between the grinding bracket 610 and the wheel cover 640.

The moving plate 650 is connected to the drive shaft 621 of the grinding motor 620 through a bushing 651, and is installed to be movable in the vertical direction of the grinding bracket 610.

The bushing 651, which is installed at the drive shaft 621 of the grinding motor 620 and rotatably supports the drive shaft 621, is provided as a rotational supporter of a cylindrical shape.

For the vertical movement of the moving plate 650 as described above, a pair of rail blocks 653 are installed at one surface of the grinding bracket 610 corresponding to the moving plate 650. In addition, a pair of sliding blocks 655 that are slidably coupled to the rail blocks 653 are installed at one surface of the moving plate 650 corresponding to the rail blocks 653.

Here, since the grinding motor 620 is connected to the moving plate 650 through the bushing 651 on the drive shaft 621, it may move in the vertical direction with respect to the grinding bracket 610 through the rail blocks 653 and the sliding blocks 655.

For example, the grinding motor 620 may be downwardly moved by its own weight and be upwardly moved by a predetermined external force, and lowermost and uppermost movement positions of the grinding motor 620 may be determined by a separate stopper, for example, by a stopper protrusion provided at the upper and lower side of the rail blocks 653.

A second guide groove 615 for vertically guiding the bushing 651 to not disturb the vertical movement of the grinding motor 620 is formed in the grinding bracket 610.

The second guide groove 615 is formed to upwardly extend from a lower side of one surface the grinding bracket 610 corresponding to the moving plate 650 to be able to vertically guide the bushing 651 on the drive shaft 621 of the grinding motor 620.

The pressure control cylinder 660 controls a grind-pressing force of the grinding wheel 630 with respect to the brazing beads of the brazing portions of the opposite side panels 3 and the roof panel 5.

The pressure control cylinder 660 is fixedly installed at the grinding bracket 610, and is connected to the moving plate 650. The pressure control cylinder 660 is mounted on an upper end of the grinding bracket 610 through a mounting bracket 661, and may be connected to the moving plate 650 through a pressure control rod 663.

The pressure control cylinder 660, which is a proportional pressure controller to be controllable at a pressure of about 0 bar to 10 bar, may control the grind-pressing force of the grinding wheel 630 with respect to the brazing bead by applying a predetermined pneumatic pressure to the pressure control rod 663 depending on a voltage and a current.

The stopper cylinder 670 selectively limits the vertical movement of the moving plate 650, and is fixedly installed at the grinding bracket 610. That is, the stopper cylinder 670 limits the vertical movement of the grinding motor 620 by its own weight and the external force, as described above.

The stopper cylinder 670 includes a stopper-operating rod 671 that passes through the grinding bracket 610 to operate forward or backward with respect to the moving plate 650. Accordingly, a penetration hole 673 through which the stopper-operating rod 671 passes in a portion at which the stopper cylinder 670 is installed is formed in the grinding bracket 610.

A friction pad 675 is installed at one surface of the moving plate 650 corresponding to a front end of the stopper-operating rod 671. The friction pad 675 closely contacts the front end of the stopper-operating rod 671, thereby limiting the vertical movement of the grinding motor 620 by its own weight and the external force. For example, the friction pad 675 may be made of a plastic material such as Teflon.

As described above, the reason that the grinding motor 620 may be vertically moved by its own weight and the vertical movement of the external force and that the grinding motor 620 by its own weight and the external force may be limited by the stopper cylinder 670 is to reduce abrasion of the grinding wheel 630 when the brazing beads are ground by the grinding wheel 630.

Further, since the grinding assembly 600 is moved along a predetermined teaching path by the grinding robot 601 and the brazing beads are ground by the grinding wheel 630, a grinding surface of the grinding wheel 630 should always grind the brazing beads at a predetermined position.

However, when the grinding wheel 630 is newly installed at the grinding motor 620, the grinding surface of the grinding wheel 630 is positioned at a lower position than that of the brazing bead.

In this case of the exemplary embodiment of the present disclosure, the moving plate 650 together with the grinding wheel 630 moves the grinding motor 620 upwardly and positions the grinding surface of the grinding wheel 630 at the predetermined position by exerting an external force to the grinding wheel 630 through a separate supporter 603. In addition, the movement of the grinding motor 620 is limited by the stopper cylinder 670, and the grinding motor 620 may be fixed to a predetermined position of the grinding surface of the grinding wheel 630.

In contrast, when abrasion of the grinding wheel 630 occurs while the brazing beads are ground by the grinding wheel 630, the grinding surface of the grinding wheel 630 is positioned at a higher position than that of the brazing bead.

In this case, when the movement limit of the grinding motor 620 is released through the stopper cylinder 670, the grinding motor 620 is downwardly moved by its own weight together with the grinding wheel 630, and the grinding surface of the grinding wheel 630 is positioned at a predetermined position by the supporter 603. In addition, by the movement of the grinding motor 620 is limited by the stopper cylinder 670, and may be fixed to the predetermined position of the grinding surface of the grinding wheel 630.

The stopper cylinder 670 may be operated through a sensor (not shown) that senses the grinding surface based on the predetermined position of the grinding surface with respect to the grinding wheel 630.

Referring to FIG. 1 and FIGS. 19 to 22, a bead inspection unit 700 is provided to inspect the brazing beads ground by the grinding assembly 600 in the exemplary embodiment of the present disclosure. That is, the bead inspection unit 700 automatically inspects for defects of the brazing beads ground by the grinding assembly 600.

The bead inspection unit 700 is installed at the grinding assembly 600, and may be transferred along the ground brazing beads of the brazing portions of the opposite side panels 3 and the roof panel 5 by the grinding robot 601.

Figure 23:
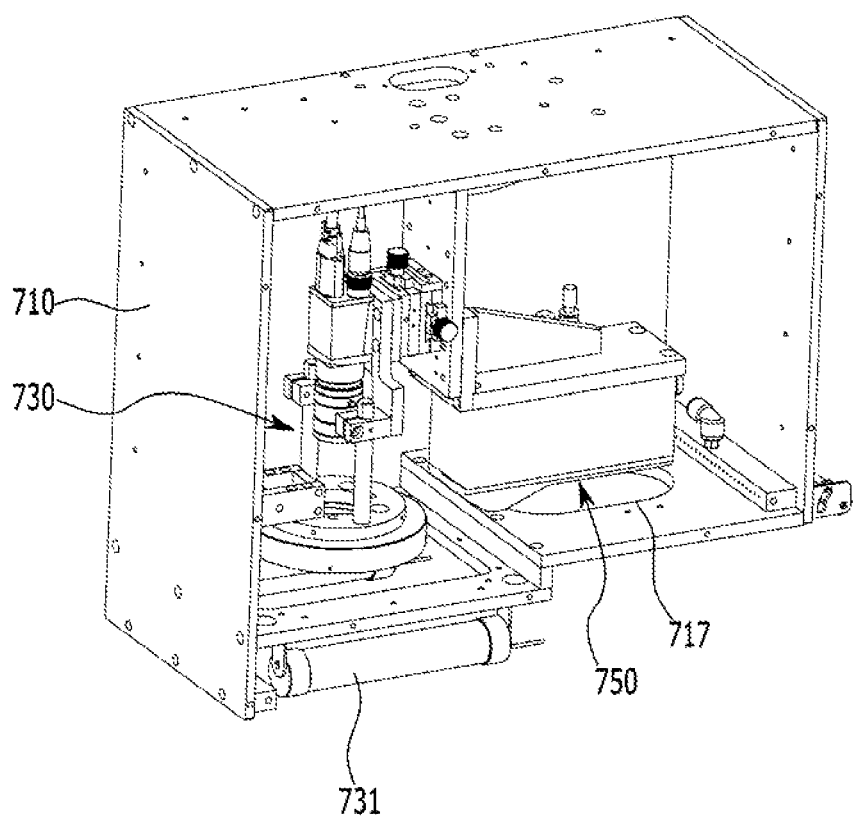
FIG. 23 illustrates a schematic diagram of a bead inspection unit applied to a roof laser brazing system according to an exemplary embodiment of the present disclosure.

As shown in FIG. 23, the bead inspection unit 700 includes a mounting bracket 710, a vision camera 730, and a second profile sensor 750.

The mounting bracket 710 is fixedly installed at the grinding bracket 610 of the grinding assembly 600. The mounting bracket 710 may rotate together with the grinding bracket 610 by the grinding robot 601.

The vision camera 730, which vision-photographs the ground brazing beads and outputs the vision-photographed data to the aforementioned controller, is fixedly installed to the mounting bracket 710.

Here, a lighting unit 731 irradiating light to the ground brazing beads is installed at the mounting bracket 710. The lighting unit 731 is fixedly installed at the mounting bracket 710 in a vision-photographing area of the vision camera 730.

The controller may calculate a width, etc. of the ground brazing bead by analyzing the vision data transmitted from the vision camera 730, and may detect a defect of the ground brazing bead by comparing the calculated value with a reference value of the ground brazing bead.

The vision camera 730 vision-photographs a predetermined reference point of the body 1 such as a front glass-mounting hole and a brazing portion of a center pillar side before the brazing beads are ground by the grinding assembly 600, and may output the vision-photographed data to the controller. That is, the vision camera 730 may detect a position of the body 1 before the brazing beads are ground by the grinding assembly 600.

The controller may calculate a position value of the body 1 by analyzing the vision data transmitted from the vision camera 730, and may detect the defect of the ground brazing bead by comparing the calculated value with a reference position value of the body.

The second profile sensor 750, which scans the ground brazing bead to measure a height, etc. of the ground brazing bead, is fixedly installed at the mounting bracket 710 together with the vision camera 730.

The second profile sensor 750 may scan the ground brazing bead with a laser slit, and may measure the height, etc. of the brazing bead. For example, the second profile sensor 750 detects a cross-section of the ground brazing bead as a 2-dimensional profile shape, and outputs the detected signal to the controller.

The controller may calculate a height, etc. of the ground brazing bead by analyzing the detected signal transmitted from the second profile sensor 750, and may detect the defect of the ground brazing bead by comparing the calculated value with a reference value of the ground brazing bead.

Since the profile sensor is configured as a profile sensor based on the well-known disclosed technologies in the art, a detailed description thereof will be omitted in the present specification.

Here, a beam through hole 717 passing a scan beam (laser slit) irradiated from the second profile sensor 750 therethrough is formed in the mounting bracket 710.

Operation of the roof laser brazing system according to the exemplary embodiment of the present disclosure will now be described in detail with reference to aforementioned drawings.

First, in the exemplary embodiment of the present disclosure, the body 1, the opposite side panels 3 of which are assembled to the predetermined structure, is transferred to the side home position jig 200 of the brazing section 8 along the transfer line 7 by the carriage (not shown) in the main buck process of the vehicle body assembly line.

Here, the moving frame 220 of the side home position jig 200 has been moved away from the opposite side panels 3 of the body 1 along the width direction of the body 1 by the first driving part 225.

That is, the clampers 250 installed at the support frame 240 by the post frame 230 on the moving frame 220 have been moved away from the opposite side panels 3 of the body 1 by the moving frame 220.

In the exemplary embodiment of the present disclosure, the support frame 240 is rotated by the drive motor 214, and the clampers 250 corresponding to the body 1 of the kind of vehicle are positioned at the opposite side panels 3 of the body 1.

In the above-described state, when the body 1 is positioned in the side home position jig 200 side of the brazing section 8, the moving frame 220 is moved to the opposite side panels 3 of the body 1 by the first driving part 225, and the clampers 250 are moved to a predetermined position corresponding to the body 1 of the kind of vehicle.

Next, the clampers 250 themselves are moved forward to the opposite side panels 3 of the body 1 by the second driving part 253 along the width direction of the body 1, and then the upper portions of the opposite side panels 3 are clamped by the clampers 250.

Next, in the state in which the opposite side panels 3 of the body 1 are restricted by the clampers 250, the roof panel 5 aligned in the roof alignment jig 101 is unloaded from the roof alignment jig 101 through the roof loading jig 103, and then the roof panel 5 is loaded on the opposite side panels 3 of the body 1.

Here, the roof loading jig 103 unloads and loads the roof panel 5 in the state in which the roof loading jig 103 is mounted on the handling robot 301. In the state in which the roof panel 5 is loaded on the opposite side panels 3 of the body 1 through the roof loading jig 103, the roof loading jig 103 is separated from the handling robot 301, and then the spot welding gun is mounted on the handling robot 301.

Next, the roof panel 5 and the front/rear roof rails are spot-welded by each of one spot by the spot welding gun of the handling robot 301 and the spot welding gun of the welding robot 105. Next, the spot welding gun is separated from the handling robot 301, and then the roof-pressing jig 300 is mounted on the handling robot 301.

Next, the roof-pressing jig 300 is moved to the roof panel 5 by the handling robot 301, and then the roof panel 5 is home-positioned and pressed by the roof-pressing jig 300.

When the operation of the roof-pressing jig 300 is described in more detail, the jig frame 310 of the roof-pressing jig 300 is moved to the roof panel 5 by the handling robot 301.

When the jig frame 310 is pressed with respect to the roof panel 5 by the handling robot 301, the opposite side edges of the roof panel 5 are supported by the restriction pad 320 while the skin surfaces of the opposite side edges are vacuum-adsorbed by the vacuum cups 330.

In these processes, when the restriction pin-operating rod 343 of the restriction pin cylinder 341 downwardly operates forward, the restriction pin-operating rod 343 upwardly operates backward.

Then, the restriction bracket 345 at which the restriction pin 340 is installed supports the bottom surface of the roof panel 5 through the restriction pin-operating rod 343, and the restriction pin 340 is upwardly inserted into the restriction hole 6a of the roof panel 5, thereby restricting the roof panel 5.

At the same time, when the reference pin-operating rod 363 of the reference pin cylinder 361 upwardly operates backward, the reference pin-operating rod 363 downwardly operates forward.

Then, the reference pin 360 is downwardly inserted into the reference hole 6b of the roof panel 5 by the reference pin-operating rod 363 to hold the reference position of the roof panel 5.

In the process in which the roof panel 5 is home-positioned and pressed through the roof-pressing jig 300, the docking bracket 317 of the jig frame 310 may be docked to the support bracket 233 of the side home position jig 200.

When the docking bracket 317 is docked to the support bracket 233, the fixing pin 235 of the support bracket 233 is coupled to the pin hole 319 of the docking bracket 317. The pin clamper 237 on the support bracket 233 is rotated depending on an operation of the pin clamping cylinder 238, and clamps the fixing pin 235 together with the docking bracket 317 through an operating pressure of the pin clamping cylinder 238.

Accordingly, in the exemplary embodiment of the present disclosure, the roof panel 5 loaded on the opposite side panels 3 of the body 1 may be home-positioned and pressed by the roof-pressing jig 300.

In addition, the docking bracket 317 of the roof-pressing jig 300 may be docked to the support bracket 233 of the side home position jig 200, and the docking bracket 317 may be stably fixed to the support bracket 233 by the fixing pin 235 and the pin clamper 237.

When the roof panel 5 is pressed by the roof-pressing jig 300, the brazing assembly 400 is moved to the matching portions between the opposite side panels 3 and the roof panel 5 by the brazing robot 401.

Then, the sensor bracket 511 of the gap measurement unit 500 is moved forward to the matching portions between the opposite side panels 3 and the roof panel 5 by the operating cylinder 520.

Accordingly, the first profile sensor 510 fixed to the sensor bracket 511 is close to the matching portions between the opposite side panels 3 and the roof panel 5, and the brazing robot 401 moves the first profile sensor 510 along the matching portions between the opposite side panels 3 and the roof panel 5.

In this process, the first profile sensor 510 scans the matching portions between the opposite side panels 3 and the roof panel 5 with the laser slit to measure the gap of the matching portions. In this case, the first profile sensor 510 sets the virtual reference line based on a straight-line portion of the roof panel 5, and calculates the distance between profiles generated on the virtual reference line, thereby measuring the matching gap between the roof panel 5 and the opposite side panels 3.

The first profile sensor 510 transmits the matching gap value between the roof panel 5 and the opposite side panels 3 to the controller, and the controller applies the control signal to the second driving part 253 of the side home position jig 200 depending on the measured gap value between the roof panel 5 and the opposite side panels 3.

Then, the clampers 250 of the side home position jig 200 restricting the opposite side panels 3 of the body 1 are moved in the width direction of the body 1 by the second driving part 253, and the opposite side panels 3 are flowingly moved and home-positioned in the width direction of the body 1.

Accordingly, the matching portions between the opposite side panels 3 and the roof panel 5 are laser-brazed by the brazing assembly 400, and the gap of the matching portions may be measured by the gap measurement unit 500.

Accordingly, the matching gap between the roof panel 5 and the opposite side panels 3 may be zero by compensating the positions of the opposite side panels 3 by the side home position jig 200 based on the gap value between the roof panel 5 and the opposite side panels 3.

As such, in the state of zeroing the matching gap between the roof panel 5 and the opposite side panels 3 by compensating the positions of the opposite side panels 3, the sensor bracket 511 of the gap measurement unit 500 is moved backward by the operating cylinder 520.

Then, the brazing assembly 400 is moved along the bonding portions between the opposite side panels 3 and the roof panel 5 (matching portions) by the brazing robot 401, and the bonding portions between the opposite side panels 3 and the roof panel 5 are laser-brazed by the brazing assembly 400.

In the state of avoiding interference with the sensor bracket 511 by the operating cylinder 520, the brazing assembly 400 irradiates the laser beam to the bonding portions between the opposite side panels 3 and the roof panel 5 through the laser head 430, and supplies the filler wire 405 to the focus position of the laser beam through the wire feeder 450.

The brazing assembly 400 melts the filler wire 405 through the laser beam which is the heat source, and the bonding portions between the opposite side panels 3 and the roof panel 5 may be integrally brazed through the melted filler wire 405.

As described above, when the bonding portions between the opposite side panels 3 and the roof panel 5 are brazed by the brazing assembly 400, air is supplied in the air jet passage 555 of the sensor bracket 511 by the air blower 550.

It is possible to prevent a foreign material from being attached to the laser-brazing portions between the opposite side panels 3 and the roof panel 5 by injecting the air supplied by the air blower 550 in a direction perpendicular to the irradiation direction of the laser beam through the air jet passage 555.

When the bonding portions between the opposite side panels 3 and the roof panel 5 are brazed by the brazing assembly 400, the brazing beads are generated at the bonding portions.

When the bonding portions between the opposite side panels 3 of the body 1 and the roof panel 5 are completely laser-brazed, the side home position jig 200 and the roof-pressing jig 300 are positioned at the home position.

Next, the roof-pressing jig 300 is separated from the handling robot 301, and then the spot welding gun is mounted on the handling robot 301. Then, the roof panel 5 and the front/rear roof rails are spot-welded by the spot welding gun of the handling robot 301 and the spot welding gun of the welding robot 105.

Next, after the body 1 is transferred along the transfer line 7 to the grinding section 9, the grinding assembly 600 is moved to the brazing bead of the bonding portions between the opposite side panels 3 and roof panel 5 by the grinding robot 601 in the grinding section 9.

Before the grinding assembly 600 is moved to the brazing bead of the bonding portions between the opposite side panels 3 and the roof panel 5, the grinding wheel 630 of the grinding assembly 600 may be newly mounted on the grinding motor 620.

In this case, since the grinding assembly 600 is moved by the grinding robot 601 along a predetermined teaching path and the brazing bead is ground by the grinding wheel 630, the grinding surface of the grinding wheel 630 is positioned below the reference position thereof based on the position of the brazing bead.

Accordingly, the stopper-operating rod 671 of the stopper cylinder 670 is moved backward to release the movement restriction of the grinding motor 620. Then, the grinding motor 620 is downwardly moved through the moving plate 650 together with the grinding wheel 630 by its own weight.

In the state, the grinding motor 620 is moved upwardly together with the grinding wheel 630 through the moving plate 650 by applying the external force to the grinding wheel 630 through the separate supporter 603, and the grinding surface of the grinding wheel 630 is positioned at the reference position.

Next, the stopper-operating rod 671 of the stopper cylinder 670 is moved forward, and the movement of the grinding motor 620 is limited by the friction pad 675 closely contacted with the front end of the stopper-operating rod 671.

After the grinding assembly 600 is moved to the brazing bead, the vision camera 730 of the bead inspection unit 700 mounted on the grinding robot 601 together with the grinding assembly 600 senses the position of the body 1.

The vision camera 730 vision-photographs the brazing portions of the front glass mounting hole and the center pillar of the body 1, and outputs the photographed vision data to the controller. The controller analyzes the vision data transmitted from the vision camera 730 to calculate the position value of the body 1, and compensates the grinding position of the grinding assembly 600 by comparing the calculated position value with the reference value (reference position value of the body).

Next, the grinding wheel 630 is rotated by the grinding motor 620, the grinding wheel 630 is moved along the brazing beads by the grinding robot 601, and the brazing beads are ground by the grinding wheel 630.

The grinding-dust particles scattered during grinding of the brazing beads are collected in the wheel cover 640 surrounding the grinding wheel 630, and the grinding-dust particles are sucked through the inlet 645 of the wheel cover 640 and then exhausted outside the wheel cover 640. In the exemplary embodiment of the present disclosure, the grind-pressing force of the grinding wheel 630 with respect to the brazing bead may be controlled by the pressure control cylinder 660.

In the exemplary embodiment of the present disclosure, as the brazing beads are ground by the grinding wheel 630, the grinding wheel 630 is worn away.

In this case, since the grinding assembly 600 is moved by the grinding robot 601 along the predetermined teaching path and the brazing bead is ground by the grinding wheel 630, the grinding surface of the grinding wheel 630 is positioned above the reference position thereof based on the position of the brazing bead.

Accordingly, the stopper-operating rod 671 of the stopper cylinder 670 is moved backward to release the movement restriction of the grinding motor 620. Then, the grinding motor 620 is downwardly moved together with the grinding wheel 630 by its own weight, and the grinding surface of the grinding wheel 630 is positioned at the predetermined position by the supporter 603.

Then, the stopper-operating rod 671 of the stopper cylinder 670 is moved forward, and the movement of the grinding motor 620 is limited by the friction pad 675 closely contacted with the front end of the stopper-operating rod 671.

After the brazing bead is ground by the grinding assembly 600, the grinding bracket 610 of the grinding assembly 600 is rotated by the grinding robot 601.

Then, the mounting bracket 710 of the bead inspection unit 700 rotates together with the grinding bracket 610, and the vision camera 730 of the bead inspection unit 700 and the second profile sensor 750 are positioned at the ground brazing bead side.

Next, the bead inspection unit 700 is moved along the ground brazing beads by the grinding robot 601, and the ground brazing beads are photographed by the vision camera 730 and then the photographed vision data is output to the controller.

The controller calculates the width of the ground brazing bead by analyzing the vision data transmitted from the vision camera 730, and detects a defect of the ground brazing bead by comparing the calculated width with a reference width (reference width of the ground brazing bead).

While performing the processes, the second profile sensor 750 detects the cross-section of the ground brazing bead as a 2-dimensional profile shape, and outputs the detected signal to the controller.

The controller calculates the height of the ground brazing bead by analyzing the detected signal transmitted from the second profile sensor 750, and detects the defect of the ground brazing bead by comparing the calculated value with a reference value (reference value of the ground brazing bead).

If a defect of the ground brazing bead is detected by the bead inspection unit 700, the detected defect is displayed on a display, and the detected defect is transmitted to a repair process and quality history management server.

As such, when the defect detection of the ground brazing bead is completed, the grinding robot 601 is positioned at the home position, and the body 1 to which the roof panel 5 is bonded is transferred to a subsequent process through the transfer line 7.

Therefore, the roof laser brazing system 100 according to the exemplary embodiment of the present disclosure may laser-braze the roof panel 5 to the opposite side panels 3 based on the body 1 depending on the processes described above.

Therefore, according to the exemplary embodiment of the present disclosure, it is possible to remove the roof molding according to the conventional art by laser-brazing the bonding portions between the opposite side panels 3 of the body 1 and the roof panel 5.

Further, according to the exemplary embodiment of the present disclosure, it is possible to improve an appearance of the body of the vehicle, reduce material costs, and reduce labor costs due to mounting the roof molding, by removing the roof molding according to the conventional art.

Further, according to the exemplary embodiment of the present disclosure, since the roof panel 5 is home-positioned and restricted to the opposite side panels 3 through the roof-pressing jig 300, the gaps between the opposite side panels 3 and the roof panel 5 are zeroed through the side home position jig 200 and the gap measurement unit 500, the opposite side panels 3 and the roof panel 5 are laser-brazed, and the grinding defect of the brazing bead is automatically detected by the bead inspection unit 700, it is possible to further improve the brazing quality.

Further, according to the exemplary embodiment of the present disclosure, since the roof panel 5 may be laser-brazed corresponding to the bodies 1 of various kinds of vehicles, it is possible to flexibly produce various kinds of vehicles, to reduce equipment-preparing time, to achieve a weight reduction and simplification of entire equipment, and to reduce initial investment and additional investment for additional vehicles.

While this disclosure has been described in connection with what is presently considered to be practical exemplary embodiments, it is to be understood that technical aspects of the present disclosure are not limited to the exemplary embodiments suggested in the specification, but, although a person of ordinary skill in this field of art who understands the technical aspects of the present disclosure can suggest another exemplary embodiment by modifications, changes, removal, and addition of constituent elements within a range of technical aspects that are the same as in the present disclosure, it will also be within a range of right of the present disclosure.

What is claimed is:

1. A roof laser brazing system which includes a predetermined brazing section and a predetermined grinding section along a transferring path of a body for bonding a roof panel to opposite side panels based on the body including the opposite side panels, comprising:
    a side home position jig installed at each of opposite sides of the transferring path of the body in the brazing section, and that restricts and home-positions the opposite side panels of the body;
    a roof-pressing jig detachably mounted on a handling robot, docked to the side home position jig, and that home-positions and presses the roof panel loaded on the opposite side panels;
    a brazing device mounted on at least one brazing robot in the side home position jig side, the brazing device brazing bonding portions between the opposite side panels and the roof panel using a laser as a heat source;
    a grinding device mounted on at least one grinding robot in the grinding section, the grinding device grinding brazing beads of the bonding portions between the opposite side panels and the roof panel; and
    a bead inspection unit including a profile sensor installed at the grinding device, that inspects a brazing bead ground by the grinding device, and that senses a position of the body, the bead inspection profile sensor including a mounting bracket installed at the grinding device such that the mounting bracket and the grinding device are rotatable by the at least one grinding robot,
    wherein the roof-pressing jig includes:
        a jig frame mounted on the handling robot;
        a restriction pad installed at each of left and right sides of the jig frame and that supports opposite side edges of the roof panel along a length direction of the opposite side panels;
        a plurality of vacuum cups installed at the jig frame, that respectively pass through a plurality of penetration holes continuously formed in the restriction pad along the opposite side edges of the roof panel, and that vacuum-adsorb skin surfaces of the opposite side edges of the roof panel;
        a restriction pin that is vertically movable at the jig frame in a front end side of the restriction pad and is inserted upwardly from a lower side with respect to a restriction hole formed in the roof panel;
        a restriction pin cylinder connected to the restriction pin so that the restriction pin is vertically moved and is installed at the jig frame;
        a reference pin installed to be vertically movable at the jig frame in a rear end side of the restriction pad and that is inserted downwardly from an upper side with respect to a reference hole formed in the roof panel; and
        a reference pin cylinder connected to the reference pin so that the reference pin is vertically moved and is installed at the jig frame.

2. The roof laser brazing system of claim 1, further comprising a gap measurement sensor installed to be movable forward or backward to the brazing device and that measures matching gaps between the roof panel and the opposite side panels pressed by the roof-pressing jig.

3. The roof laser brazing system of claim 2, wherein the side home position jig home-positions the opposite side panels depending on the matching gaps measured by the gap measurement sensor, and ensures a zero gap between the opposite side panels and the roof panel.

4. The roof laser brazing system of claim 1, further comprising:
 a roof alignment jig installed between the brazing section and the grinding section and aligns the roof panel; and
 a roof loading jig detachably installed at the handling robot, that unloads the roof panel from the roof alignment jig, and that loads the roof panel on the opposite side panels.

5. A roof laser brazing system which laser-brazes a roof panel to opposite side panels based on a body including the opposite side panels, comprising:
 a side home position jig installed at each of opposite sides of a transferring path of the body in a brazing section set along the transferring path of the body, the side home position jig restricting the opposite side panels of the body;
 a roof-pressing jig detachably mounted on a handling robot, that is docked to the side home position jig, and that home-positions and presses the roof panel loaded on the opposite side panels;
 a brazing device mounted on at least one brazing robot in the side home position jig side, the brazing device brazing bonding portions between the opposite side panels and the roof panel using a laser as a heat source;
 a gap measurement sensor mounted on the brazing device and that measures matching gaps between the roof panel and the opposite side panels that are pressed by the roof-pressing jig;
 a grinding device mounted on at least one grinding robot in a grinding section set along the transferring path of the body, the grinding device grinding brazing beads of the bonding portions between the opposite side panels and the roof panel; and
 a bead inspection unit including a profile sensor installed at the grinding device, that inspects a brazing bead ground by the grinding device, and that senses a position of the body, the bead inspection profile sensor including a mounting bracket installed at the grinding device such that the mounting bracket and the grinding device are rotatable by the at least one grinding robot,
 wherein the roof-pressing jig includes:
  a jig frame mounted on the handling robot;
  a restriction pad installed at each of left and right sides of the jig frame and that supports opposite side edges of the roof panel along a length direction of the opposite side panels;
  a plurality of vacuum cups installed at the jig frame, that respectively pass through a plurality of penetration holes continuously formed in the restriction pad along the opposite side edges of the roof panel, and that vacuum-adsorb skin surfaces of the opposite side edges of the roof panel;
  a restriction pin that is vertically movable at the jig frame in a front end side of the restriction pad and is inserted upwardly from a lower side with respect to a restriction hole formed in the roof panel;
  a restriction pin cylinder connected to the restriction pin so that the restriction pin is vertically moved and is installed at the jig frame;
  a reference pin installed to be vertically movable at the jig frame in a rear end side of the restriction pad and that is inserted downwardly from an upper side with respect to a reference hole formed in the roof panel; and
  a reference pin cylinder connected to the reference pin so that the reference pin is vertically moved and is installed at the jig frame.

6. The roof laser brazing system of claim 5, wherein the side home position jig includes:
 a base frame installed at each of the opposite sides of the transferring path with the transferring path of the body therebetween;
 a moving frame reciprocally and slidably movable in a width direction of the body through a plurality of guide rails provided in the base frame;
 a post frame disposed in a direction perpendicular to opposite sides of the moving frame;
 a support frame installed at the post frame along a length direction of the opposite side panels;
 a plurality of clampers mounted on the support frame along the transfer direction of the body, that are reciprocally movable in the width direction of the body, and that restrict the opposite side panels; and
 a first driving part at the base frame to reciprocally move the moving frame in the width direction of the body.

7. The roof laser brazing system of claim 6, wherein the first driving part includes:
 a first servo motor fixedly mounted on the base frame; and
 a lead screw connected to the first servo motor and substantially screw-fixed to the moving frame.

8. The roof laser brazing system of claim 6, wherein the clampers are reciprocally movable in the width direction of the body by a second driving part provided in the support frame, and
 the second driving part includes:
 a second servo motor at the support frame; and
 a linear motion guide connected to the second servo motor, that fixes the clamper, and that is reciprocally movable in the width direction of the body by the second servo motor.

9. The roof laser brazing system of claim 6, wherein the post frame includes:
 a fixing pin coupled to fix the roof-pressing jig;
 a pin clamper that restricts a pin connection portion of the roof-pressing jig; and
 a support bracket at which the fixing pin and the pin clamper are installed, and that is installed to dock with the roof-pressing jig.

10. The roof laser brazing system of claim 5, wherein a docking bracket docked to the side home position jig is fixedly installed at opposite sides of each of front and rear ends of the jig frame, and
 a pin hole in which a fixing pin provided in the side home position jig is inserted is formed in the docking bracket.

* * * * *